A. S. KIRSHNER.
MACHINE FOR EXTRACTING OILS.
APPLICATION FILED AUG. 28, 1913.
1,151,798.
Patented Aug. 31, 1915.
11 SHEETS—SHEET 2.
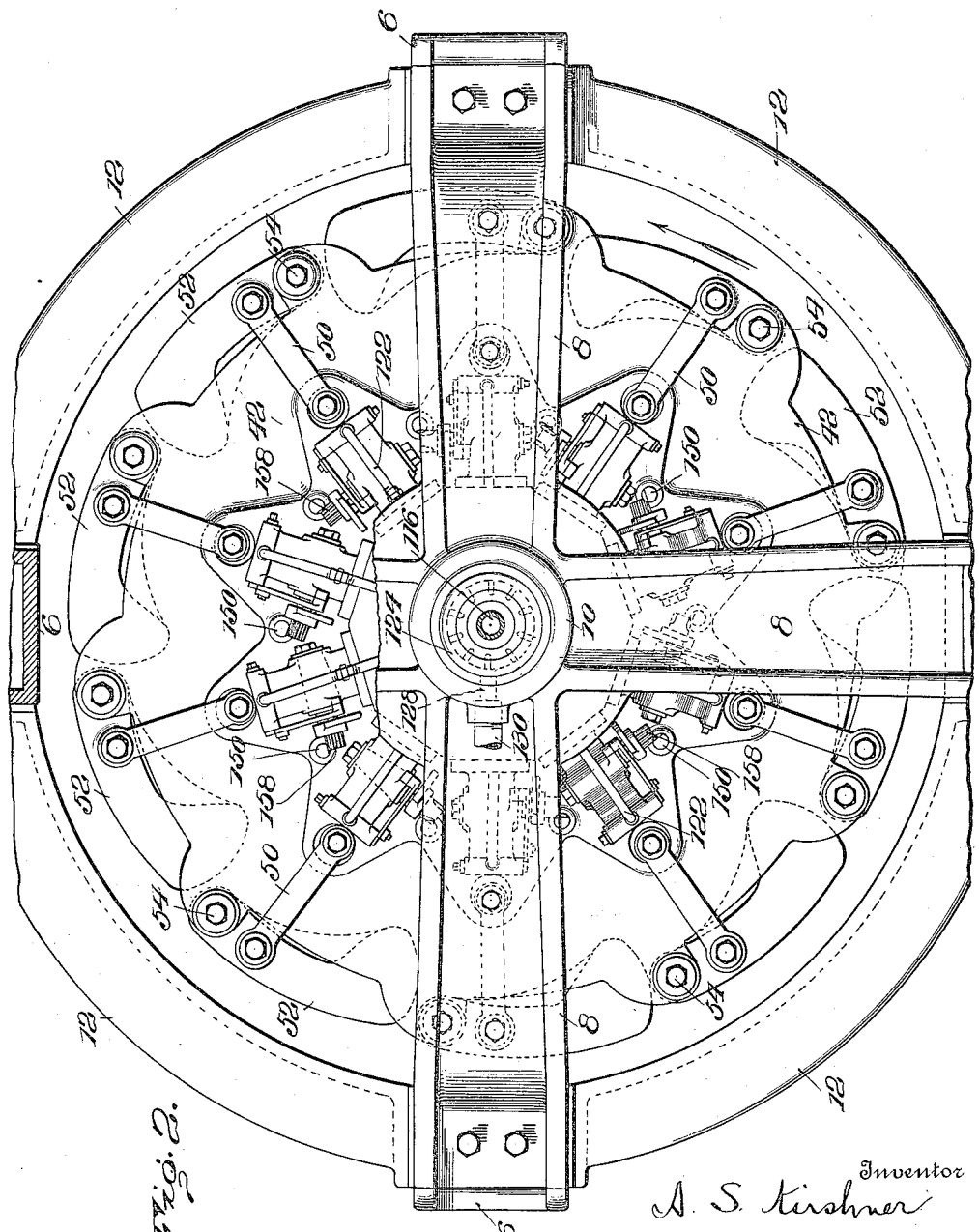
Witnesses
W. A. Williams
R. W. Brown
Inventor
A. S. Kirshner
By Robertson & Johnson
Attorneys

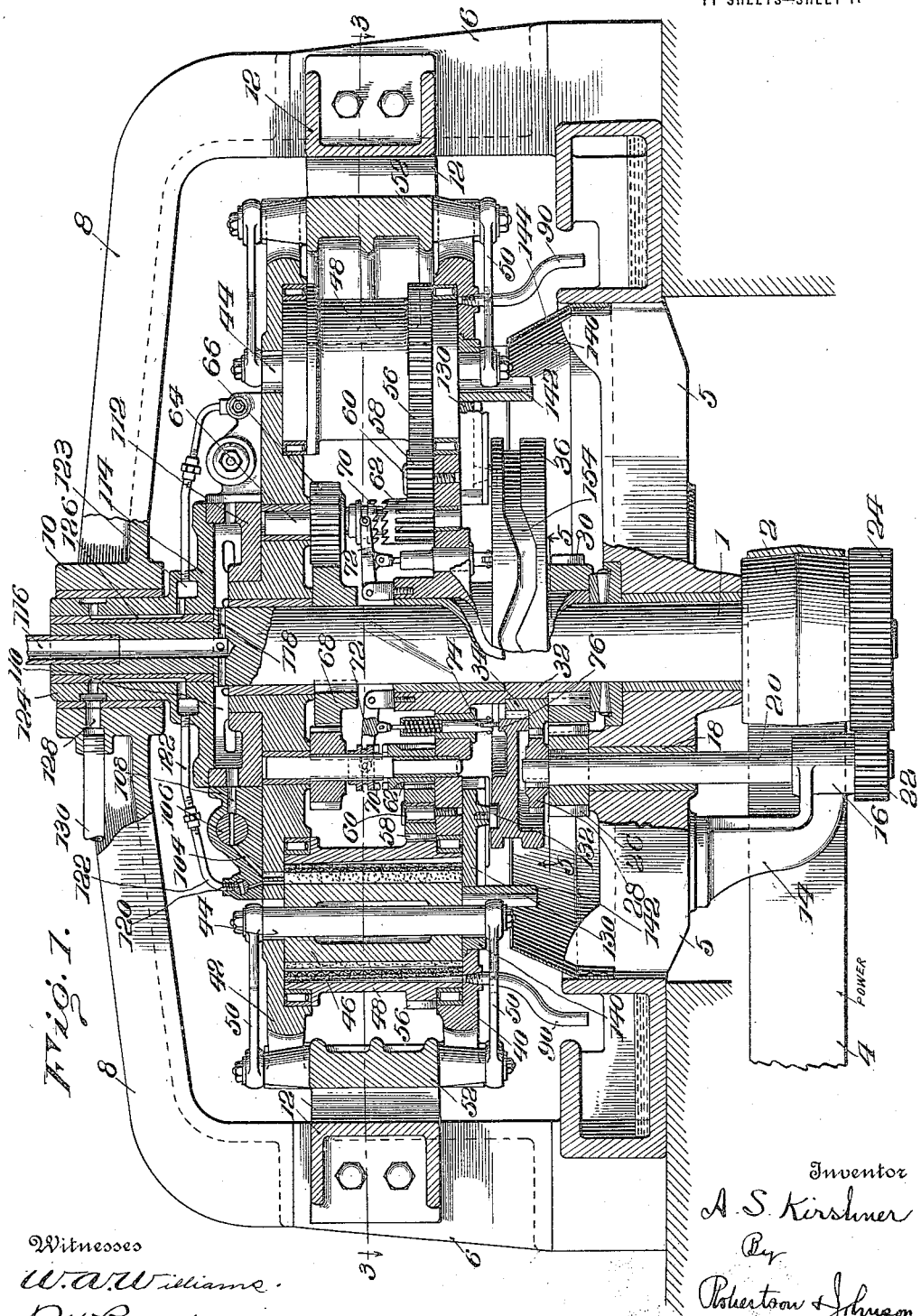

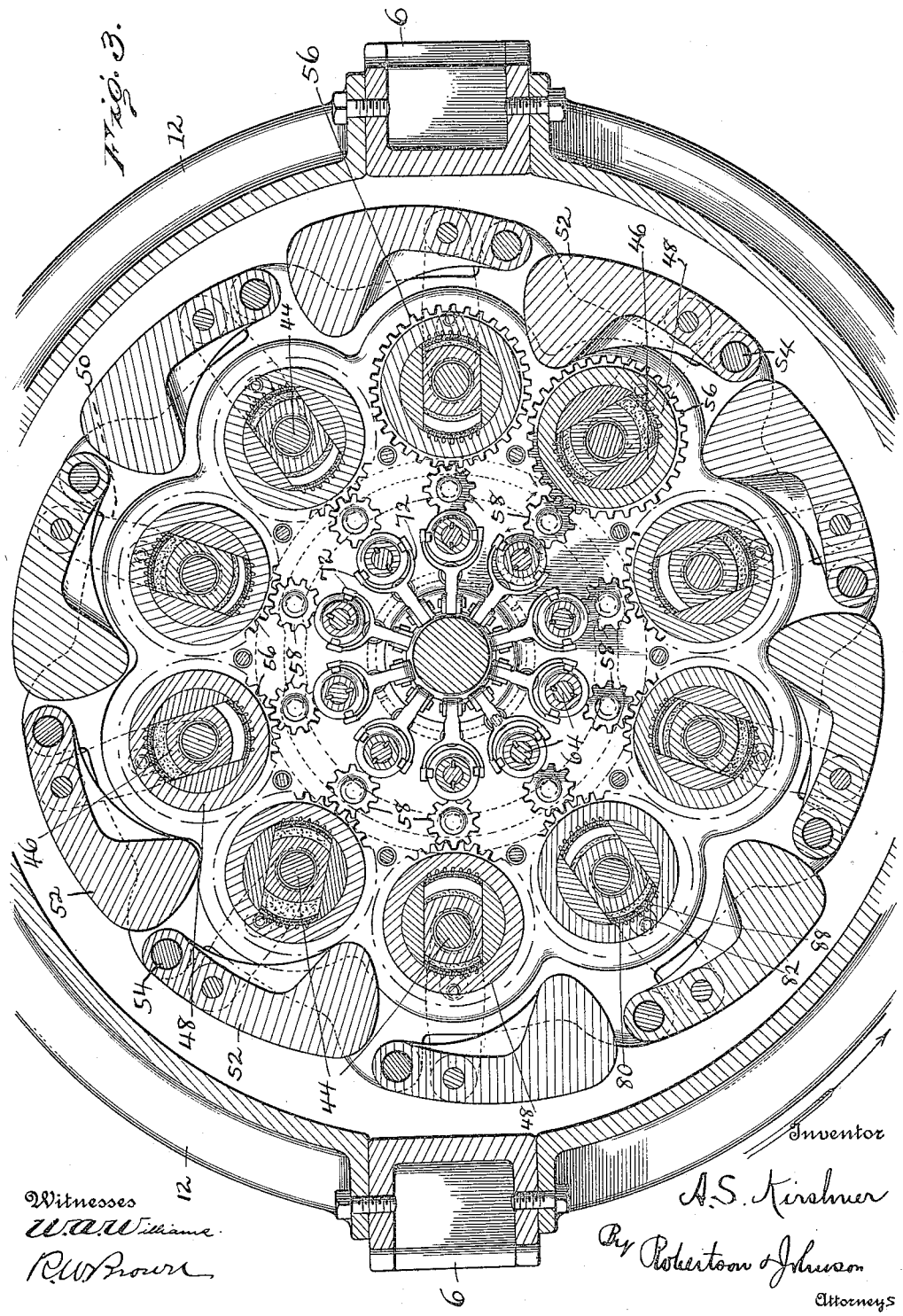

A. S. KIRSHNER.
MACHINE FOR EXTRACTING OILS.
APPLICATION FILED AUG. 28, 1913.
1,151,798. Patented Aug. 31, 1915.
11 SHEETS—SHEET 4.
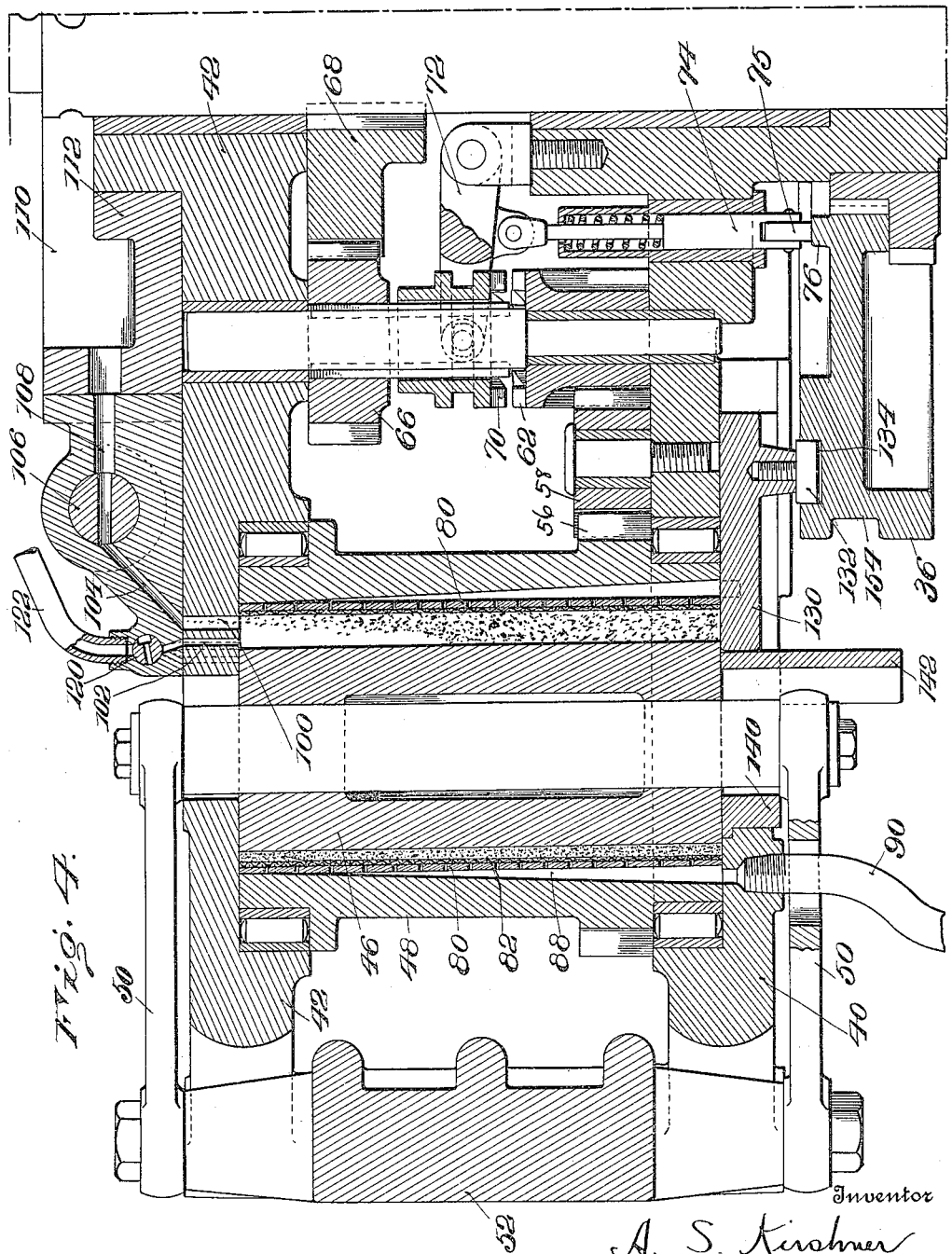
Witnesses
W. A. Williams
R. W. Brown
Inventor
A. S. Kirshner
By Robertson & Johnson
Attorneys

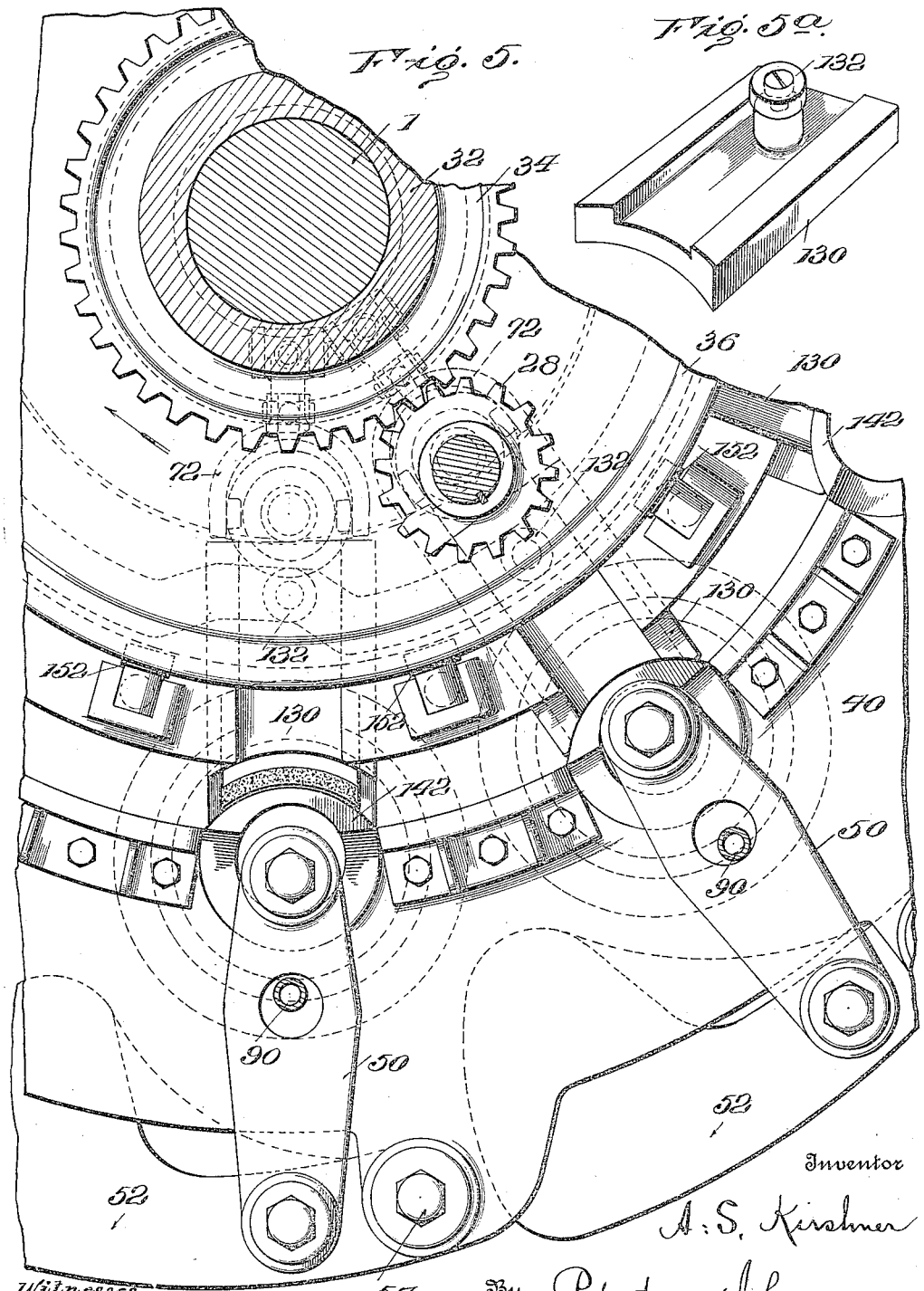

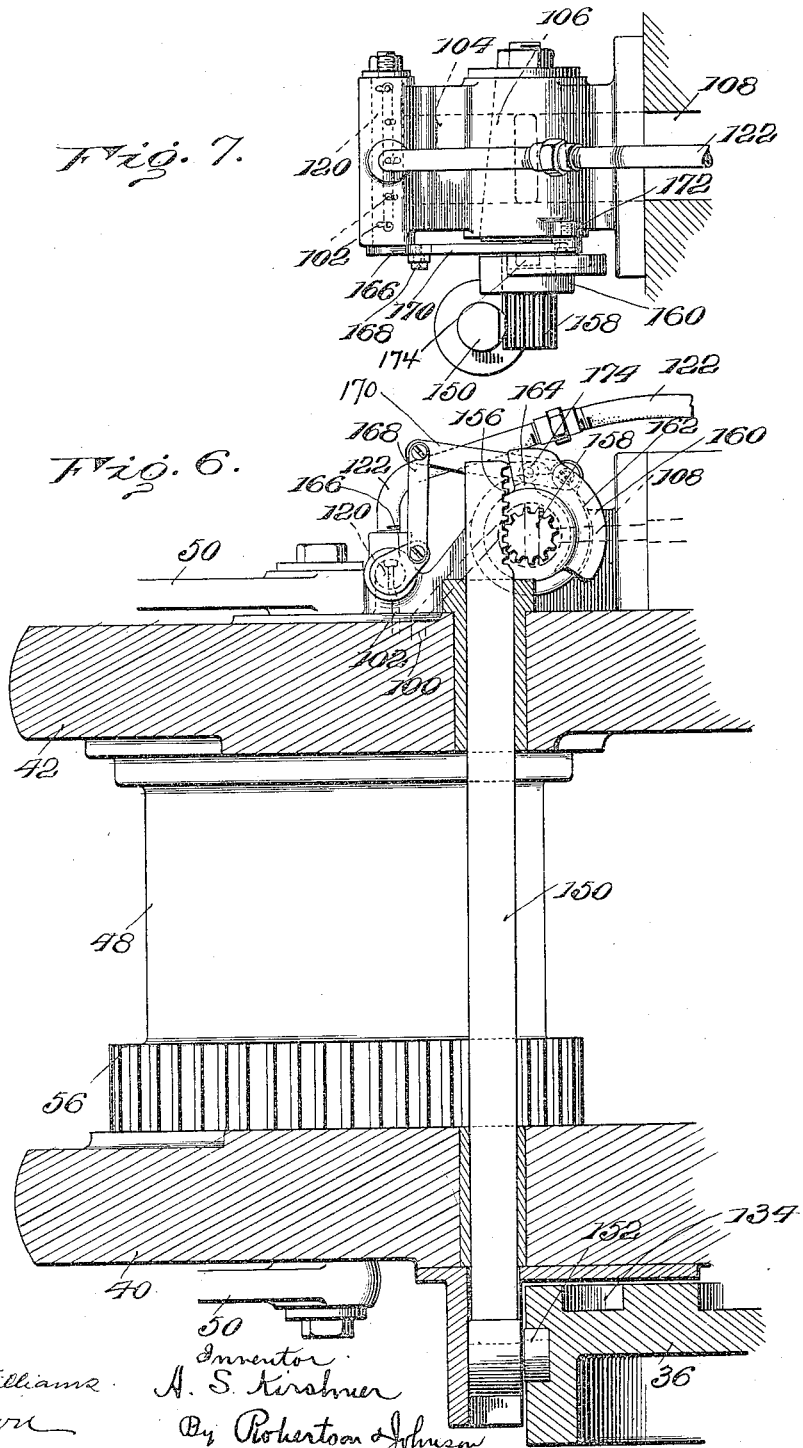

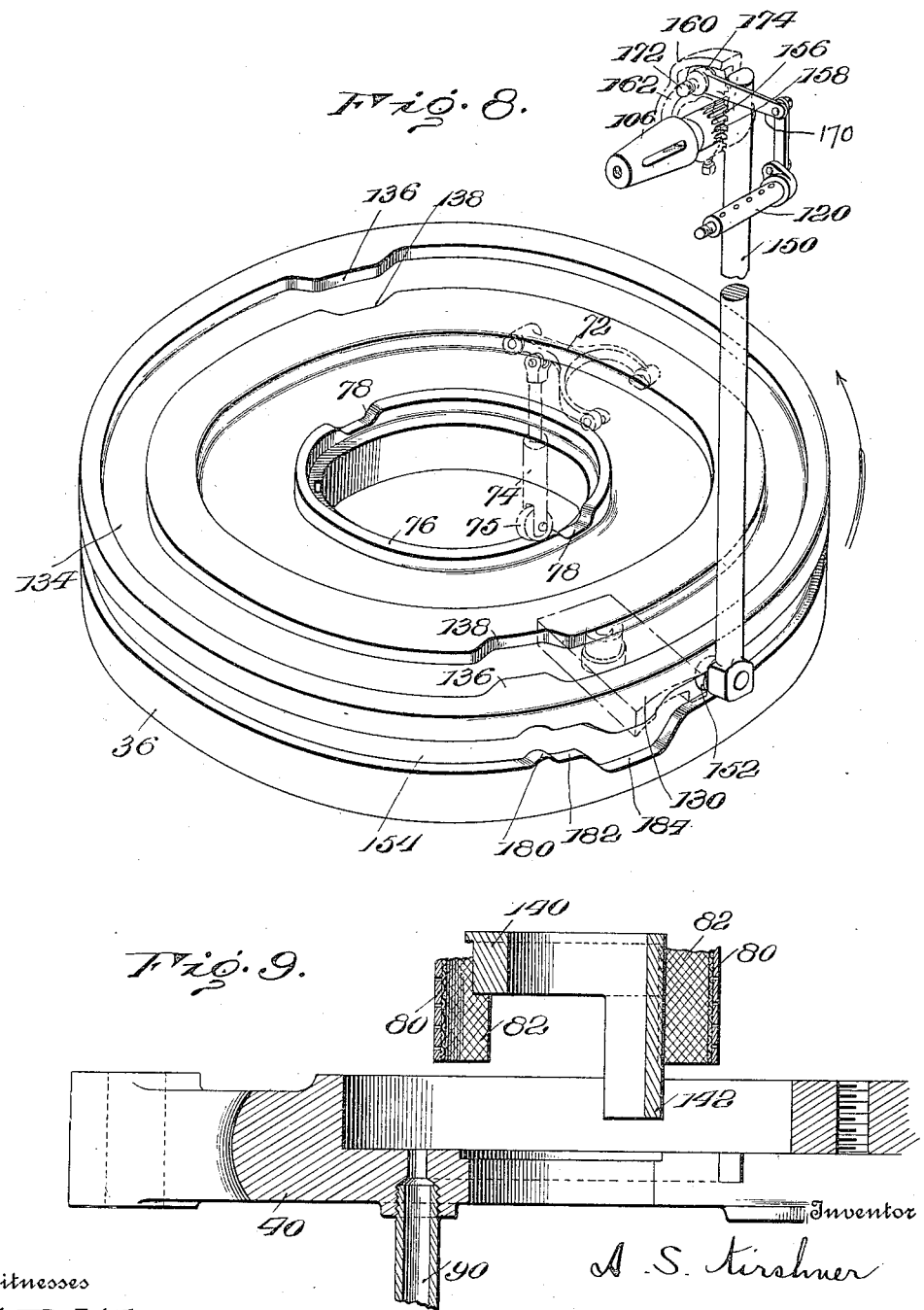

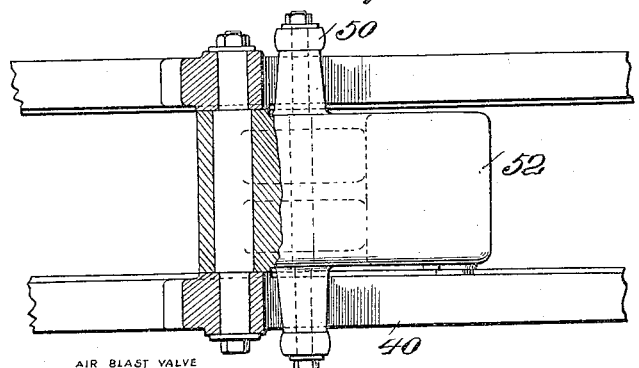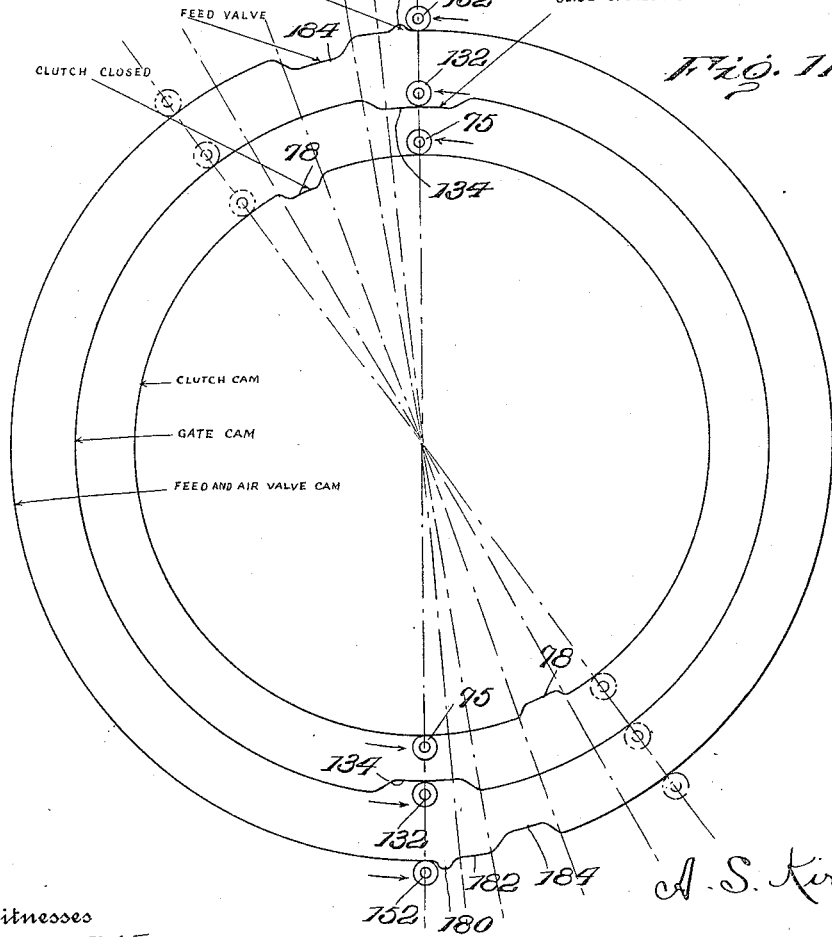

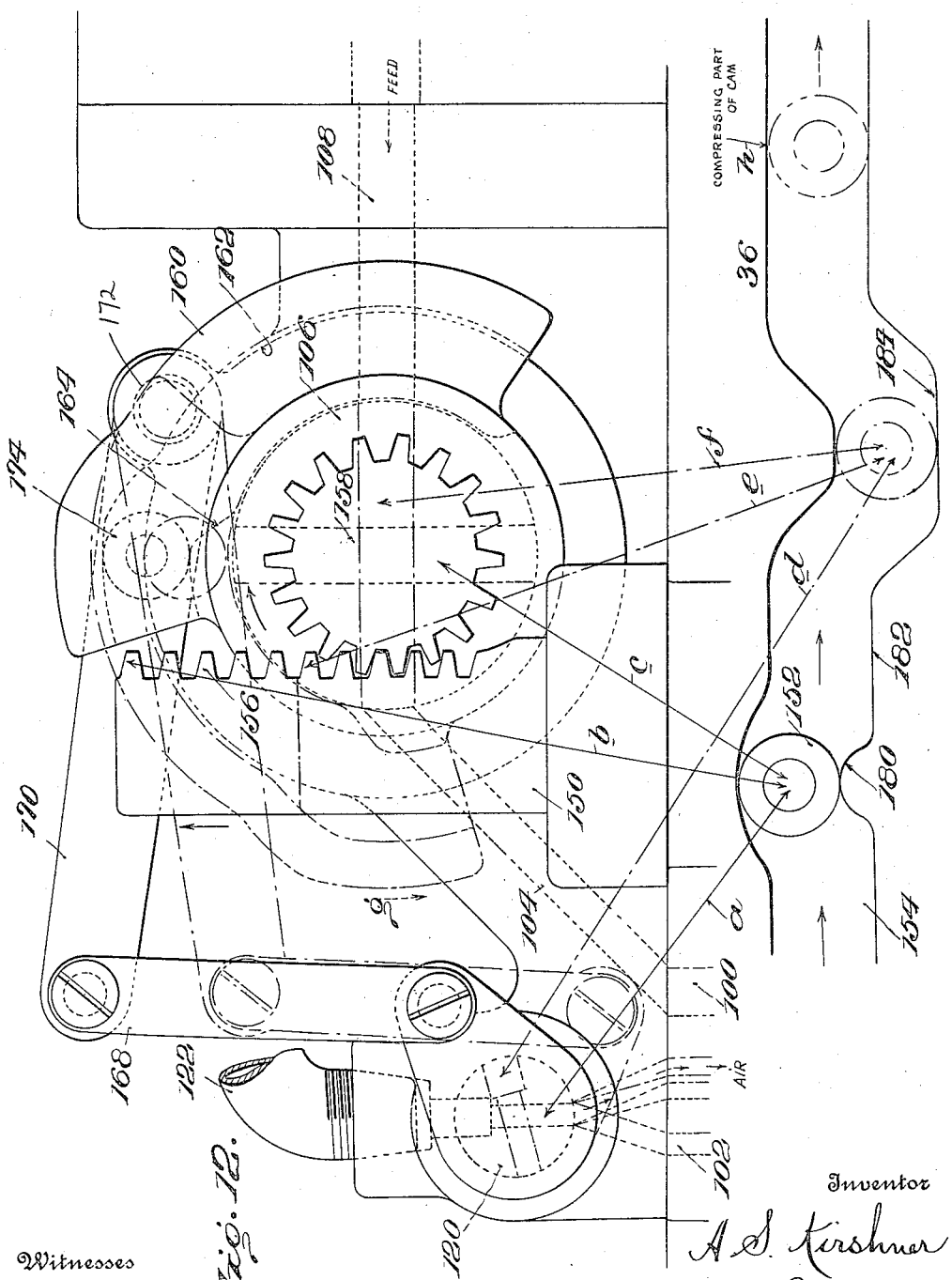

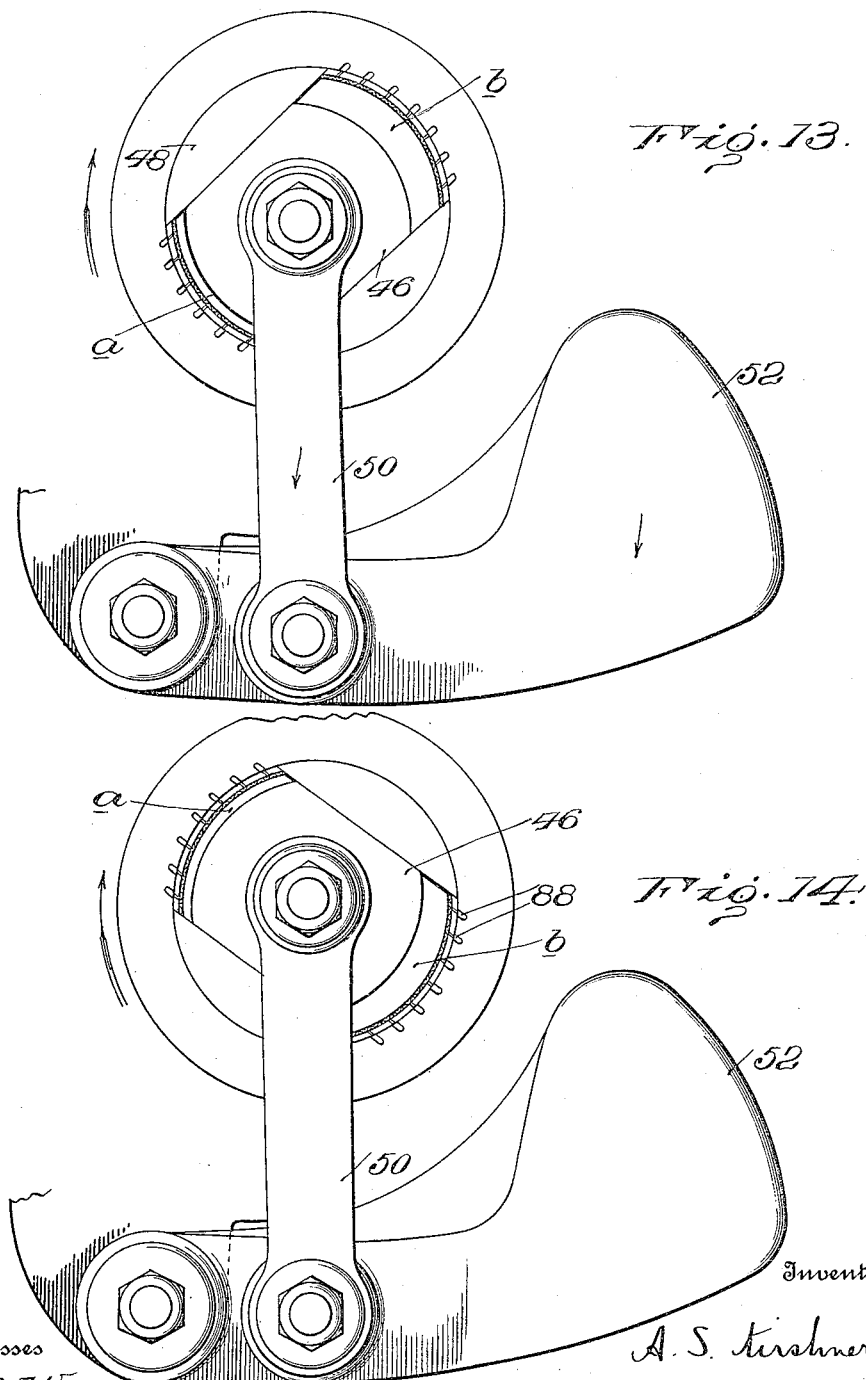

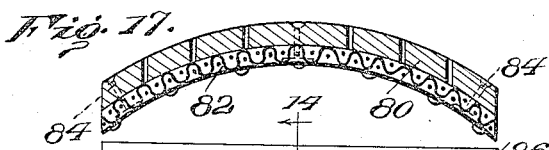
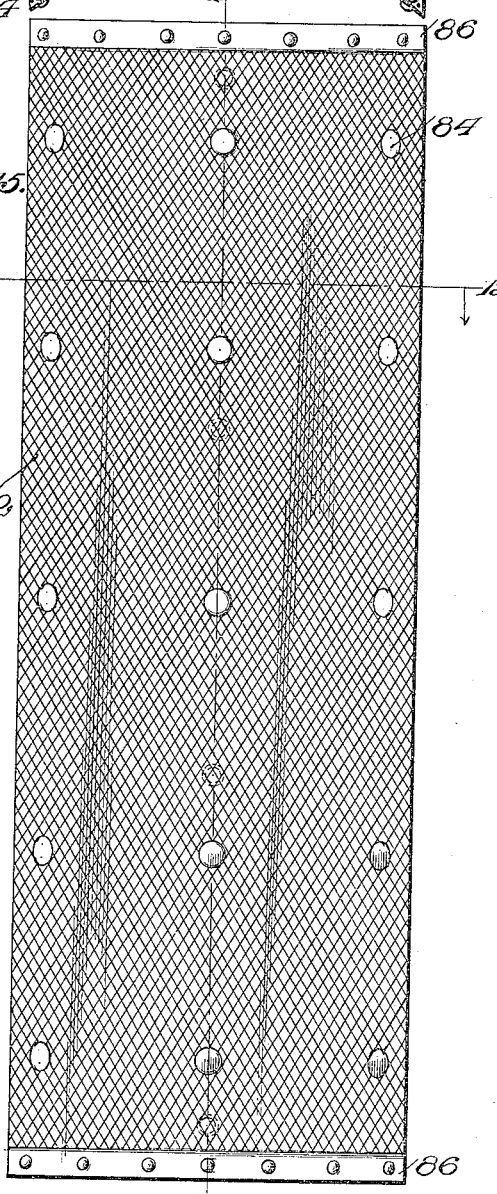
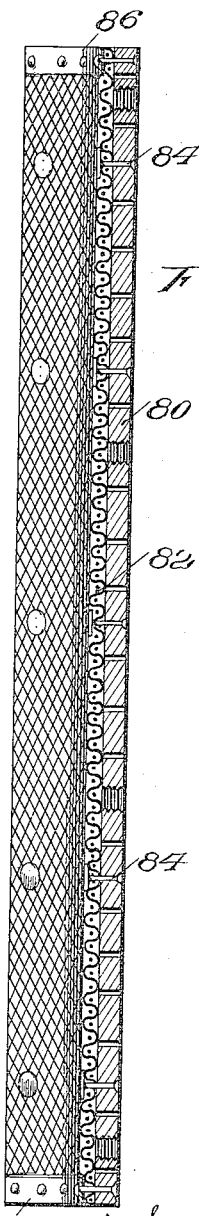

UNITED STATES PATENT OFFICE.

ABRAHAM S. KIRSHNER, OF PHILADELPHIA, PENNSYLVANIA.

MACHINE FOR EXTRACTING OILS.

1,151,798.     Specification of Letters Patent.     Patented Aug. 31, 1915.

Application filed August 28, 1913. Serial No. 787,214.

*To all whom it may concern:*

Be it known that I, ABRAHAM S. KIRSHNER, a citizen of the United States of America, and a resident of Philadelphia, in the county of Philadelphia and State of Pennsylvania, have invented certain new and useful Improvements in Machines for Extracting Oils, of which the following is a specification.

This invention relates to improvements in machines adapted for expressing oil from seed, and it is intended particularly for use with cotton seed, but it will be obvious that the use is not confined to this purpose.

The invention consists in the machine shown in its preferable but not necessary embodiment in the accompanying drawings and as hereinafter described and claimed.

In the aforesaid drawings: Figure 1 is a vertical central section of a machine made in accordance with my invention. Fig. 2 is a top plan view with parts broken away. Fig. 3 is a horizontal section on the line 3—3 of Fig. 1. Fig. 4 is a section on an enlarged scale through one of the compressing devices and its coöperating parts. Fig. 5 is a detail on a much enlarged scale, partly in section, showing the under side of the structure shown in Fig. 4. Fig. 5ª is a perspective view of one of the details shown in Fig. 5. Fig. 6 is a sectional view showing the device for operating the valves. Fig. 7 is a detail of the valve operating mechanism. Fig. 8 is a perspective view of the cams and valve operating mechanism. Fig. 9 is a vertical section of one of the main plates and adjacent parts slightly moved out of their normal positions. Fig. 10 is a detail, partly in section, of one of the centrifugal weights and its connection. Fig. 11 is a diagrammatic view of the cam grooves. Fig. 12 is a diagrammatic view of the cam operating mechanism. Figs. 13 and 14 are diagrammatic views of the expressing devices. Fig. 15 is a side elevation of the plate against which the material is compressed. Fig. 16 is a vertical section of the plate shown in Fig. 13. Fig. 17 is a horizontal cross section of the same.

Referring now to the details of the drawings by numerals: 1 designates the main shaft having a pulley 2 thereon which may be driven by an ordinary belt 4. The shaft 1 is vertically disposed and finds a bearing in a main frame 5 which extends laterally from said shaft and from which projects upwardly vertical frame members 6 which in turn have horizontal members 8 meeting at the center in the form of a bearing 10, as clearly seen in Figs. 1 and 2. This bearing 10 affords an upper support for the top of the shaft 1 and its surrounding parts hereinafter described. The four uprights 6 are connected together by curved frame members 12, as shown in Fig. 2, and it will be understood that the horizontal frame 5, the aforesaid uprights 6, the horizontal members 8, the central bearing 10 and the curved segmental frame members 12 are all fixtures and that the shaft 1 and the other parts hereinafter referred to rotate within the space inclosed by said members. From the horizontal frame 5 depends an arm 14 having a bearing 16, and in this bearing and another bearing 18 is journaled a supplemental shaft 20. This shaft 20 has fixed to it a gear 22 meshing with and receiving motion from a gear 24 fixed to the main shaft 1.

To the upper end of the supplemental shaft 20 are secured two gears 26 and 28, the gear 26 meshing with a gear 30 which is keyed to a sleeve 32 journaled upon the vertical shaft 1. The other gear 28, keyed to the supplemental shaft 20, meshes with a gear 34 which is journaled upon the aforesaid sleeve 32 and this gear 34 has keyed to it the cam wheel 36. The gear 28 is slightly smaller than the gear 26 and consequently the gear 34 and its cam wheel 36 are driven at a slightly lower speed than the gear 30 and the sleeve 32, so that the sleeve 32 progresses in its rotary movement with respect to the cam wheel 36 for a purpose to be hereinafter described. A circular plate 40 is secured to the sleeve 32 and some distance above this circular plate 40 is a similar plate 42. These plates 40 and 42 each has a central opening for the shaft 1 and in addition said plates are provided with concentric openings, as hereinafter described, said openings being preferably arranged in series of ten. The outer series of ten openings are to receive vertical rods 44 upon which are secured compression blocks 46 which work within drums 48; it being understood that there are ten blocks 46 and ten drums 48 for the ten rods 44. The rods 44 are connected by links 50 with centrifugal weights 52 so that, when the plates 40 and 42 are rotated at great speed, centrifugal action of the weights 52 will force the compression blocks 46 outward within the spaces of the drums 48, the centrifugal weights 52 being pivoted at 54 (see Fig. 2). Each of the drums 48 is provided on its exterior with a gear 56 and this gear meshes with a small gear 58 journaled upon a stud shaft 60 and meshing with a gear clutch 62 upon a shaft 64. It will be understood that there are ten shafts 64 and it will be seen that these shafts are journaled in the inner series of openings in the plates 40 and 42 and, as said plates are rotated with respect to the main shaft 1, said shafts 64 are rotated owing to the fact that gears 66, keyed to said shafts 64, mesh with a gear 68 keyed to the main shaft 1. Each of the shafts 64 has keyed thereto an upper clutch member 70 and if these clutch members were constantly in engagement with the aforesaid clutch member 62, then the drums 48 would be constantly rotated, but the upper clutch members 70 are provided with forked levers 72 which in turn are provided with spring actuated plungers 74 acting to normally hold the clutch levers with the clutches in the open position shown in Fig. 1 so that the drums 48 cannot be rotated unless the forked levers are operated to make one of the clutch members 62 engage its complemental clutch member 70. To bring these clutches into engagement at the proper time, the aforesaid cam wheel 36 is provided with an annular cam flange 76, this flange being provided with two depressions 78 (see Fig. 8) which, as the cam is rotated so as to bring either of said depressions under the aforesaid plungers 74, permits the spring of the appropriate plunger to force the plunger downward so as to bring the two clutch members 70 and 62 into engagement, and as long as the clutching engagement continues, motion is transmitted from the gear 68 through the gears 66, 62 to the gear 58 and from that gear to the gear 56 and its drum 48. Depressions 78 in the cam flange 76 are of sufficient length to maintain the clutch members 70 and 62 in engagement for a period sufficient to rotate the appropriate drum 48 180°, at which time the flange at the other end of the depression operates to thrust the rod upward against the tension of its spring to break the clutch 70, 62. The reason the short depressions 78 permit any of the plungers 74 to be depressed by its spring a sufficient length of time to rotate its appropriate drum 48 180° is due to the fact that, as before stated, the plates 40 and 42 carrying the drums 48 progress in their rotary movement with respect to the cam 36. The ratio of the gears to each other is such that it takes 2400 revolutions of the plates 40 and 42 to gain one revolution upon the main cam 36.

Each of the drums 48, as before stated, has a compression block 46 working therein which are of the shape shown in horizontal section in Fig. 3 and are capable of movement back and forth. In other words, each of the compression blocks 46 has two flat sides connected by curved ends, and the drums 48 have their interiors also formed with two flat sides connected by two curved ends, so that each flat sided compression block 46 fits within the flat sided interior of its drum 48. However, the curved ends of the interior of each drum are farther apart than the length of the compression blocks 46 so that the compression blocks are capable of movement within the drums, the flat sides of the compression blocks sliding within the flat sides of the drum. The curved interior walls of the drums 48 are provided with perforated steel plates 80 (see Figs. 4, 15, 16 and 17) and each of these plates has a facing of camel's hair 82 secured thereto by means of rivets 84, a securing plate 86 being employed at the top and bottom to more securely hold the camel's hair in position. The interior of the drums 48, behind the curved perforated plates 80, are provided with vertical grooves 88, the construction being such that when the compression blocks 46 are forced outward against the camel's hair covering, as indicated at the left of Fig. 4, the oil is expressed from the seed and passes through the camel's hair, through the openings in the plate 82, into the vertical grooves 88 and from thence the oil drops by gravity into and through tubes 90 shown in Figs. 1 and 4. These tubes 90 rotate with the plate 40 and the drums, and the lower ends of the tubes enter the mouth of an annular well formed in the main frame 5 as clearly indicated in Fig. 1. The horizontal section, Fig. 4, shows one of the compression blocks 46 at its extreme compressing point with a cake of compressed seed under the action of its centrifugal weight 52, and with a charge being fed in at the right hand side of the compression block in a manner to be hereinafter described. Figs. 13 and 14 show in diagrammatic views the action of the compression blocks; Fig. 13 showing one of the centrifugal weights 52 still in the act of compressing the seed at the place indicated at $a$; the space marked $b$ having been filled with a new charge. Further rotation of the drum 48 from the position shown in Fig. 13 will draw inward its weight 52 against centrifugal force, until the straight interior walls of the drum 48 are in the position shown in Fig. 14 when the links 50 connecting the compression blocks 46 with the weight 52 will be in such a position that, centrifugal force acting upon the weight 52, will cause said links 50 to draw the compression blocks downward from the point shown in Fig. 14 in order to compress the charge which has been previously fed into the opening b.

Various mechanisms are provided in order to inject a fresh supply of material into the drums 48 prior to compression, also to eject the material after compression, and in addition, a gate has to be opened in order that compressed material may be ejected, and of course said gate has to be closed after ejection in order to be ready to receive a new charge.

I will now describe the various mechanisms for supplying material, opening the gate, for ejecting material, and for closing the gate.

As shown in Figs. 1 and 4, at one period of movement of the drums 48, the open space b referred to in Figs. 13 and 14 is immediately under two ports 100 and 102, the first of which is for feeding material to the opening, and the other for injecting a blast of air to eject the compressed cake. The port 100 is in communication with a port 104 which leads to a valve chamber containing a valve 106. On the other side of the valve is a port 108 communicating with a large chamber 110 formed between two plates 112 and 114 located upon the upper side of the large revolving plate 42. This large chamber 110 is constantly in communication with a central feed opening 116 in the main shaft 1, radial passages 118 being provided whereby material may be fed under pressure from the central passage 116 to the large chamber 110. It will be understood that when the valve 106 is in the open position shown in Figs. 1 and 4, the material under pressure will pass through said valve, through the ports 104 and 100 and into the drum 48. At the appropriate time, the valve 106 is turned to shut off the supply of material. The other port 102, hereinbefore referred to, is arranged to feed a blast of air, and in order to control the air a valve 120 is provided, and a pipe 122 leading from this valve to an annular chamber 123 in the upper plate 114 hereinbefore described. This plate 114 is provided with a hub 124 which is formed with vertical passages 126 leading to a radial passage 128 provided with an air supply pipe 130. It follows from this construction that when the air valve 120 is in the open position, a blast of air will be fed through the pipe 130 and its connecting openings into the chamber within the drum, to expel the compressed charge. However, before the charge can be ejected a gate at the bottom end of the compression block must be opened. Such a gate is designated 130 and is shown in Figs. 1 and 4. This gate is arranged to slide radially at the appointed time, and to that end is provided on its lower side with a roller 132 which rides within a cam groove 134 on the face of the main cam 36 (see Figs. 4 and 8). This cam groove 134 is provided with two sets of projections 136 and complemental recesses 138. When the roller 132 enters one side of the recess 138 the gate is withdrawn and held withdrawn until the roller leaves the other side of the recess 138 when the gate is automatically closed in a manner easily understood from Fig. 8.

The opening in the bottom plate 40 (see Figs. 4 and 9) is provided with an annular filler 140 shown in position in Fig. 4 and illustrated out of position in Fig. 9, this filler having a downwardly projecting apron 142 against which the gate 130 hereinbefore referred to closes, as seen in Fig. 4. This apron 142 of course rotates with the plate 40, and when the gate 130 is opened, the cake is ejected from its drum, and the apron 142 guides the cake downward through the opening near the framework where it may enter a suitable bin (not shown); it being understood of course that if it were not for this apron 142, centrifugal force acting upon the cake, as it is ejected, would tend to throw the cake outward. I might here mention the fact that the framework is formed with an upwardly projecting circular plate 144 which forms additional means of preventing any material from escaping laterally.

In order to operate the valves 106 and 120 at the appropriate times, I employ vertically disposed valve operating rods 150 shown best in Figs. 6, 7 and 8. Each of these rods 150 is intended to open and close both valves and to that end its lower end is provided with a cam roller 152 which enters the cam groove 154 in the periphery of the aforesaid main cam 36. The upper end of the valve rod is provided with a rack 156 which meshes with a pinion 158 projecting from the stem of the feed valve 106 (see Fig. 7). It will be obvious that the up and down movement of the valve rod 150, through the rack 156 and the gear 158, will rotate the feed valve 106 to open and close the same. Immediately at the rear of the pinion 158, and movable therewith, is a cam 160. This cam 160 is provided with a cam groove 162 having a hump 164 thereon, as indicated particularly in Figs. 6 and 12. The valve 120, before mentioned, has a short crank arm 166 projecting therefrom which is pivotally connected by means of a link 168 with a cam arm 170 pivotally connected to the valve frame at 172. This cam arm 170 has a cam roller 174 which fits within the groove 162 in the cam 160. The construction is such that when the cam roller 174 is on top of the hump 164, as illustrated in Figs. 6 and 12, the valve 120 is in the open position shown in dotted lines in Fig. 6 in order that a blast of air may pass through the valve 120 and eject the cage as will be hereinafter described. The construction so far described is such that if the valve operating rod 150 is moved upward slightly, it rotates the gear 158 in a clockwise direction very slightly, sufficient however to cause the cam roller 174 to move up on top of the hump 164, thus acting upon the cam arm 170 and the link 168 to open the valve 120. If the vertically operating valve rod 150 is then moved downward, the gear 158 is rotated backward to permit the cam roller 174 to be moved downward off of its hump 164 when the air valve 120 will be closed. Further downward movement of the valve rod 150 will continue the rotation of the gear 158 but during the further rotation, the cam roller 174 remains inactive, as the cam groove permits the cam to be moved to the left in Fig. 6 without further radial or upward movement of the cam roller 174. But this further rotary movement of the gear 158 acts to rotate the feed valve 106 sufficiently to bring the same to the open position shown in Figs. 1 and 4.

I will now refer once more to the main cam 36 in order to show how the vertically operating rod 150 is given the peculiar movements before referred to in order to open and close the air valve at the proper time and then to open and close the feed valve. It will be recalled that the gear 34 and its cam wheel 36 rotate at a slightly lower speed than the gear 30, its sleeve 32 and the plates 40 and 42, so that the plates 40 and 42 overtake at a very low rate of speed the main cam 36. All of the vertically operating valve rods 150, one of which is shown in Fig. 8, rotate with the plates 40 and 42 and therefore these valve rods also slightly overtake the projections in the peripheral cam groove 154. By referring to Fig. 8, it will be seen that this cam groove is provided with a hump 180 so that as the plates 40 and 42 and the valve rods 150 overtake this hump 180, the appropriate valve operating rod 150 is given the slight upward movement hereinbefore referred to which rotates the gear 158 in a clockwise direction to move the hump 164 under the cam roller 174 and thereby open the air valve 120. Thus a blast of air is admitted through the valve to eject the cake from the right hand side of the drum 48, shown in Fig. 1. As the parts continue to rotate, the plates 40 and 42 and the particular valve rod 150 which has just been elevated by the hump 180 now pass beyond said lump onto the level portion 182, thus causing the valve rod 150 to descend to close the air valve 120. The air valve and the feed valve are now both closed and remain closed until the cam roller 152 on the valve rod 150 progresses with respect to the cam 36 until the cam drops from the level portion 182 down into the deep recess 184, shown best in Fig. 8. This causes the valve rod 150 to drop down sufficiently to rotate the gear 158 far enough to open the feed valve 106 and admit a new charge into the appropriate drum 48. The feed valve remains open for the length of the deep recess 184 but when the valve rod 150 progresses far enough to ride up at the end of this recess, said valve rod 100 will be again elevated until it reaches the normal height of the cam groove 154, shown in Fig. 8, when the feed valve 160 will be closed. From this point, both the air valve 120 and the feed valve 106 will be closed until this particular valve rod makes one-half revolution with respect to the main cam 36 to overtake the hump 180 on the opposite side of the cam, when it will be understood that the operations of both valves will be repeated.

Fig. 12 shows in diagrammatic form the valves and the cam grooves 154 just described. In this figure the cam roller 152 is shown on top of its hump 180 so that the rack 156 has been elevated slightly to move the gear 158 in the direction shown by the arrow over said gear in said Fig. 12. At this point the valve 120 is shown open, as illustrated in dotted lines, connected by the double headed full line arrow $a$, shown in full lines, connecting the cam roller 152 with the valve 120. Two other double headed full line arrows $b$ and $c$ indicate respectively the upper position of the rack 156 and the valve orifice of the valve 106 in a vertical position, whereby the feed valve 106 is closed. Now it will be understood from this Fig. 12 that when the roller 152 moves in the direction of the short arrows, indicated in the cam groove 154, the roller 152 will be caused to descend to the level 182 and as the cam roller 152 continues its further movement, it will descend farther to the position shown at 184. The position of the parts when the cam roller 152 is shown in dot and dash lines in the deep recess 184, Fig. 12, is illustrated in dot and dash lines in this figure. By referring to the double headed dot and dash arrows, $d$, $e$ and $f$, it will be noticed that the air valve 120 is shown closed; the arrow $e$ represents the rack in its lowest position so that the valves are indicated at the arrow $f$ as horizontal and therefore with the feed open. At this same point, the cam 160 is moved around to the point illustrated by the dotted arrow $g$ and by the dot and dash lines in Fig. 12. When the cam roller 152 is again elevated to the position shown by the arrow $h$ at the extreme right of Fig. 12, the valve operating rod 150 has been elevated to its normal level with both the air valve 120 and the feed valve 106 closed.

Fig. 11 shows in diagrammatic form the cam 36 with its various cam rollers. The upper roller 152 represents the roller just described for raising and lowering the valve operating rod 150 to open and close the air valve and to open and close the feed valve. The roller 132 is the roller for opening and closing the gate 130. The roller 75 is the roller for moving the plunger 74 to operate the clutch 70.

Having in mind the diagrammatic form shown in Fig. 11 and the fact that, as before stated, it takes twenty-four hundred revolutions of the plates 40 and 42 and their connected parts to gain one revolution upon the main cam 36, shown in diagrammatic view in said Fig. 11, the operation of my machine is as follows: We will assume that the parts are operating at great speed and that the tendency of the weights 52 is therefore to be thrown outward on their pivots 54 in order to compress any material which may be between the plungers 46 and the drums 48. Taking Fig. 4 as an example, it will be seen that the feed valve 106 is open, and therefore the supply of material is forced under pressure through the port 104 into the open space at the right hand of the compression block 46. At this time the roller 152 is at the lowest part 184 of its cam groove and the roller 132 is at the high part of its cam groove so that the slide 130 is closed. Therefore, the material is fed into the drum 48 as long as the valve 106 is open, or until it is full, and as the rollers 152, 132 and 75 progress with respect to the cam 36, the roller 152 will ride out of its recess 184, thus closing the feed valve 106. Further progression of said rollers will bring the roller 75 into its recess 78 so as to bring the clutches 70 and 62 into active engagement, thus causing the gears 62 and 58 to rotate the external gear 56 on the drum 48, in order to turn the drum and its compression block 46 on their axis. The length of the recess 78 is just sufficient to hold the clutch in engagement long enough to rotate the drum and its compression block 180° in order to bring the charge from the right hand side of the drum in Fig. 4 to the left hand side in order that centrifugal force acting upon the weight 52 may cause the compression block 46 to squeeze the charge against the plate 80, thus expressing the oil therefrom which, passing through the perforations in said plate 80, enters the vertical grooves 88, and drops from thence into the tubes 90 and into the well beneath said tubes. It will be recalled that it takes twenty-four hundred revolutions of the plates 40 and 42 and their connected parts to gain one lap on the main cam 36 and, as the cam has its acting parts diametrically opposite each other, as illustrated in Fig. 11, it follows that the material in the drum 48 will be under compression for one-half of the period that it takes the plates 40 and 42 and their connected parts to gain one lap on the main cam 36. Therefore, the material is under compression for the length of time that it takes the main shaft and the plates 40 and 42 and their drums to rotate twelve hundred times. However, during part of this time, it is necessary to eject the cake which has previously been compressed in the drum 48 and we will now again refer to Figs. 4 and 11. As soon as the drum 48 was rotated 180° to put its fresh charge under the influence of the compression block 46, the cake shown at the left hand side of Fig. 4 was brought around to the right hand side. As soon as the centrifugal force draws the compression block 46 to the left, it would tend to leave the space between the block and the perforated curved plate 80. We must remember, however, that centrifugal force is also acting upon the cake which is against this plate 80 and therefore the action of centrifugal force pulls the compressed cake away from said plate 80 and forces it against the right hand wall of the compression block 46, as viewed in Fig. 4, where it will be immediately under the air orifice 102. Now, by the time the charge on the other side of the block has been almost entirely compressed, the cam rollers 152, 132 and 75, illustrated at the top of Fig. 11, will overtake the main cam 36 and have reached the positions shown at the bottom of said Fig. 11. At this time the roller 132 enters its recess 134 at the bottom of Fig. 11, thus causing the slide 130 to move to the right as viewed in Fig. 4, opening the space under the opening in the drum 48 in order that the compressed charge may be expelled. At this time, as before stated, the charge just previously compressed is under the air orifice 102 and as the roller 152 rides upon the hump 180, shown at the bottom of Fig. 11, the valve operating rod 150 is elevated, as hereinbefore described, just sufficient to open the air valve 120, thus permitting a blast of air to be forced upon the upper edge of the compressed cake, thereby expelling the same from the opening in the drum 48 out of the bottom thereof, the slide 130 being still open as previously described. Continued rotation of the rollers 152, 132 and 75 brings the roller 152 over its hump and back to the level 182, shown at the bottom of Fig. 11, so that the air valve now closes, and as said rollers still progress with respect to the cam 36, the roller 132 rides out of its recess 134, thus again closing the slide 130. Now as the rollers progress still farther, the roller 152 rides into its deep recess 184, shown near the bottom of Fig. 11 and in the diagrammatic view of Fig. 12, thereby opening the main feed valve 106 in order that a new charge may be forced into the opening in the drum 48. Continued progression of said rollers will cause the roller 152 to ride out of its recess 184, thus closing the feed valve and then as the roller 75 rides into its recess 78, the clutch 62—70 is again closed to again rotate the drum 48 180°, when the operation just described is again repeated.

It will of course be understood that the operation just described with respect to one of the drums 48 is the operation repeated by all of the ten drums as they rotate with respect to the main cam 36.

It is obvious that modifications and variations may be made in my invention without departing from the spirit thereof and reference should therefore be made to the appended claims to determine the scope of the invention.

What I claim as my invention is:

1. In a device of the character described, a rotary support, a series of compression blocks carried thereby, a series of weighted members pivotally supported and arranged to be thrown outwardly on their pivots by centrifugal force as said support is rotated, and connections between said compression blocks and said weighted members whereby the weighted members move the compression blocks to compress the material operated upon.

2. In a device of the character described, a rotary support, a series of compression blocks carried thereby, centrifugally operating means for moving said compression blocks against the material operated upon, and means for feeding material to said support.

3. In a device of the character described, a rotary support, a series of compression blocks carried thereby, centrifugally operating means for moving said compression blocks against the material operated upon, means for feeding material to be compressed by said blocks, and means for ejecting said material after compression.

4. In a device of the character described, a rotary support, a series of compression blocks carried thereby, centrifugally operating means for moving said compression blocks against the material operated upon, means for feeding material to be compressed by said blocks, and means for injecting a blast of air against the material after compression to eject the same.

5. In a device of the character described, a rotary support, a series of drums rotating with said support and having chambers or recesses therein, a series of compression blocks located in the chambers or recesses of said drums, a series of weighted members pivotally supported and arranged to be thrown outwardly on their pivots by centrifugal force as said support is rotated, and connections between the compression blocks in said drums and said weighted members whereby as the weighted members are thrown outwardly on their pivots by centrifugal force the compression blocks are moved outwardly in the chambers or recesses of said drums to express the liquid from the material therein.

6. In a device of the character described, a rotary support, a series of drums rotating with said support, a series of compression blocks within said drums, means for feeding material to said drums, and centrifugally operating means for forcing said blocks outward in said drums to express the liquid therefrom.

7. In a device of the character described, a rotary support, a series of drums rotating with said support, a series of compression blocks within said drums, centrifugally operating means for forcing said blocks outward in said drums to express the liquid therefrom, and means for ejecting the material after compression from said drums.

8. In a device of the character described, a rotary support, a series of drums rotating with said support, a series of compression blocks within said drums, means for feeding material to said drums, centrifugally operating means for forcing said blocks outward in said drums to express the liquid therefrom, a gate under each drum, means for opening said gates at appropriate times, and means for ejecting the material after compression while said gates are open.

9. In a device of the character described, a rotary support, a series of drums rotating with said support and having chambers or recesses therein, perforated plates at one end of said drums, a series of compression blocks located in the chambers or recesses of said drums and movable back and forth in the chambers or recesses thereof, a series of weighted levers pivotally supported and arranged to be thrown outwardly on their pivots by centrifugal force as said support is rotated, and connections between said weighted levers and the compression blocks in said drums whereby as the weighted levers are moved outwardly on their pivots by centrifugal force the compression blocks are moved in said drums to force the material against said perforated plates and express the liquid from said material.

10. In a device of the character described, a rotary support, a series of drums, perforated plates carried thereby, a series of compression blocks carried in said drums, means for feeding material to said drums, and centrifugally operating means for forcing said blocks against said plates to squeeze the material therebetween.

11. In a device of the character described, a rotary support, a series of drums, perforated plates carried thereby, a series of compression blocks carried in said drums, means for feeding material to said drums, centrifugally operating means for forcing said blocks against said plates to squeeze the material therebetween, and means for ejecting the material after compression from said drums.

12. In a device of the character described, a rotary support, a series of drums, perforated plates carried thereby, a series of compression blocks carried in said drums, means for feeding material to said drums, centrifugally operating means for forcing said blocks against said plates to squeeze the material therebetween, and means for injecting a blast of air against the material after compression to eject it from said drums.

13. In a device of the character described, a rotary support, a series of drums carried thereby and rotatable on their axes, centrifugally operating means for compressing the material in said drums, means for feeding material to the drums, means for rotating said drums on their axes after the material is fed therein, and means for ejecting the compressed material.

14. In a device of the character described, a rotary support, a series of drums carried thereby and rotatable on their axes, centrifugally operating means for compressing the material in said drums, means for feeding material to the drums, means for rotating said drums on their axes after the material is fed therein, a gate for each drum, and means for opening said gates at appropriate times for the ejection of the material after compression.

15. In a device of the character described, a rotary support, a series of drums carried thereby and rotatable on their axes, centrifugally operating means for compressing the material in said drums, means for feeding material to the drums, means for rotating said drums on their axes after the material is fed therein, and means for injecting a blast of air through said drums.

16. In a device of the character described, a rotary support, a series of drums carried thereby and rotatable on their axes, centrifugally operating means for compressing the material in said drums, means for feeding material to the drums, means for rotating said drums on their axes after the material is fed therein, a gate for each drum, means for opening said gates at appropriate times for the ejection of the material after compression, and means for injecting a blast of air through said drums for ejecting the compressed material.

17. In a device of the character described, a rotary support, a series of compression blocks carried thereby, means for feeding material to be compressed, and a heavy member connected with each of said compression blocks and free to be thrown outward by centrifugal force as said support is rotated, whereby said compression blocks are forced against the material operated upon.

18. In a device of the character described, a rotary support, a series of compression blocks carried thereby, means for feeding material to be compressed, a heavy member connected with each of said compression blocks and free to be thrown outward by centrifugal force as said support is rotated, whereby said compression blocks are forced against the material operated upon, and means for ejecting the material from said drums after compression.

19. In a device of the character described, a rotary support, a series of compression blocks carried thereby, means for feeding material to be compressed, a heavy member connected with each of said compression blocks and free to be thrown outward by centrifugal force as said support is rotated, whereby said compression blocks are forced against the material operated upon, and means for injecting a blast of air against the material in said drums to eject the same.

20. In a device of the character described, a rotary support, a series of compression blocks carried thereby, means for feeding material to be compressed, a heavy member connected with each of said compression blocks and free to be thrown outward by centrifugal force as said support is rotated, whereby said compression blocks are forced against the material operated upon, a gate under each drum, means for opening said gates at appropriate times, and means for ejecting the material after compression while said gates are open.

21. In a device of the character described, a rotary support, a series of compression blocks carried thereby, means for feeding material while said support and blocks are rotating, and a series of heavy members supported by said rotary support and connected with said compression blocks and free to be thrown outward by centrifugal force as said support is rotated, whereby said compression blocks are forced against the material operated upon.

22. In a device of the character described, a rotary support, a series of compression blocks carried thereby, means for feeding material to be compressed, a series of heavy members supported by said rotary support and connected with said compression blocks and free to be thrown outward by centrifugal force as said support is rotated, whereby said compression blocks are forced against the material operated upon, and means for ejecting the material from said drums after compression.

23. In a device of the character described, a rotary support, a series of compression blocks carried thereby, means for feeding material to be compressed, a series of heavy members supported by said rotary support and connected with said compression blocks and free to be thrown outward by centrifugal force as said support is rotated, whereby said compression blocks are forced against the material operated upon, and means for injecting a blast of air against the material in said drums to eject the same.

24. In a device of the character described, a rotary support, a series of compression blocks carried thereby, means for feeding material to be compressed, a series of heavy members supported by said rotary support and connected with said compression blocks and free to be thrown outward by centrifugal force as said support is rotated, whereby said compression blocks are forced against the material operated upon, a gate under each drum, means for opening said gates at appropriate times, and means for ejecting the material after compression while said gates are open.

25. In a device of the character described, a rotary support, a series of compression blocks carried thereby, means for feeding material to be compressed, and a series of weights pivotally supported by said rotary support and connected with said compression blocks and free to be thrown outward by centrifugal force as said support is rotated, whereby said compression blocks are forced against the material operated upon.

26. In a device of the character described, a rotary support, a series of compression blocks carried thereby, means for feeding material to be compressed, a series of weights pivotally supported by said rotary support and connected with said compression blocks and free to be thrown outward by centrifugal force as said support is rotated, whereby said compression blocks are forced against the material operated upon, and means for ejecting the material from said drums after compression.

27. In a device of the character described, a rotary support, a series of compression blocks carried thereby, means for feeding material to be compressed, a series of weights pivotally supported by said rotary support and connected with said compression blocks and free to be thrown outward by centrifugal force as said support is rotated, whereby said compression blocks are forced against the material operated upon, and means for injecting a blast of air against the material in said drums to eject the same.

28. In a device of the character described, a rotary support, a series of compression blocks carried thereby, means for feeding material to be compressed, a series of weights pivotally supported by said rotary support and connected with said compression blocks and free to be thrown outward by centrifugal force as said support is rotated, whereby said compression blocks are forced against the material operated upon, a gate under each drum, means for opening said gates at appropriate times, and means for ejecting the material after compression while said gates are open.

29. In a device of the character described, a rotary support, a series of drums, perforated plates carried thereby, a series of compression blocks carried in said drums, means for feeding material to said drums, and a heavy member connected with each of said compression blocks and free to be thrown outward by centrifugal force as said support is rotated, whereby said compression blocks are forced outward to compress the material between said blocks and said perforated plates.

30. In a device of the character described, a rotary support, a series of drums, perforated plates carried thereby, a series of compression blocks carried in said drums, means for feeding material to said drums, a heavy member connected with each of said compression blocks and free to be thrown outward by centrifugal force as said support is rotated, whereby said compression blocks are forced outward to compress the material between said blocks and said perforated plates, and means for ejecting the material from said drums after compression.

31. In a device of the character described, a rotary support, a series of drums, perforated plates carried thereby, a series of compression blocks carried in said drums, means for feeding material to said drums, a heavy member connected with each of said compression blocks and free to be thrown outward by centrifugal force as said support is rotated, whereby said compression blocks are forced outward to compress the material between said blocks and said perforated plates, and means for injecting a blast of air against the material in said drums between said blocks and said plates to eject the compressed material.

32. In a device of the character described, a rotary support, a series of drums, perforated plates carried thereby, a series of compression blocks carried in said drums, means for feeding material to said drums, a heavy member connected with each of said compression blocks and free to be thrown outward by centrifugal force as said support is rotated, whereby said compression blocks are forced outward to compress the material between said blocks and said perforated plates, a gate under each drum, means for opening said gates at appropriate times, and means for ejecting the material from between said blocks and plates, after compression, while said gates are open.

33. In a device of the character described, a rotary support, a series of drums, perforated plates carried thereby, a series of compression blocks carried in said drums, means for feeding material to said drums, and a series of weights pivotally supported by said rotary support and connected with said compression blocks and free to be thrown outward by centrifugal force as said support is rotated, whereby said compression blocks are forced outward to compress the material between said blocks and said perforated plates.

34. In a device of the character described, a rotary support, a series of drums, perforated plates carried thereby, a series of compression blocks carried in said drums, means for feeding material to said drums, a series of weights pivotally supported by said rotary support and connected with said compression blocks and free to be thrown outward by centrifugal force as said support is rotated, whereby said compression blocks are forced outward to compress the material between said blocks and said perforated plates, and means for ejecting the material from said drums after compression.

35. In a device of the character described, a rotary support, a series of drums, perforated plates carried thereby, a series of compression blocks carried in said drums, means for feeding material to said drums, a series of weights pivotally supported by said rotary support and connected with said compression blocks and free to be thrown outward by centrifugal force as said support is rotated, whereby said compression blocks are forced outward to compress the material between said blocks and said perforated plates, and means for injecting a blast of air against the material in said drums between said blocks and said plates to eject the compressed material.

36. In a device of the character described, a rotary support, a series of drums, perforated plates carried thereby, a series of compression blocks carried in said drums, means for feeding material to said drums, a series of weights pivotally supported by said rotary support and connected with said compression blocks and free to be thrown outward by centrifugal force as said support is rotated, whereby said compression blocks are forced outward to compress the material between said blocks and said perforated plates, a gate under each drum, means for opening said gates at appropriate times, and means for ejecting the material from between said blocks and plates, after compression, while said gates are open.

37. In a device of the character described, a rotary support, a series of drums carried thereby, and rotatable on their axes, compression blocks located in said drums, means for feeding material to said drums, a heavy member connected with each of said compression blocks and free to be thrown outward by centrifugal force as said support is rotated, whereby said compression blocks are forced against the material operated upon, means for rotating said drums on their axes after the material is fed therein, and means for ejecting the compressed material.

38. In a device of the character described, a rotary support, a series of drums carried thereby, and rotatable on their axes, compression blocks located in said drums, means for feeding material to said drums, a heavy member connected with each of said compression blocks and free to be thrown outward by centrifugal force as said support is rotated, whereby said compression blocks are forced against the material operated upon, means for rotating said drums on their axes after the material is fed therein, and means for injecting a blast of air through said drums, after the material is compressed, to eject the compressed material.

39. In a device of the character described, a rotary support, a series of drums carried thereby, and rotatable on their axes, compression blocks located in said drums, means for feeding material to said drums, a heavy member connected with each of said compression blocks and free to be thrown outward by centrifugal force as said support is rotated, whereby said compression blocks are forced against the material operated upon, means for rotating said drums on their axes after the material is fed therein, a gate for each drum, and means for opening said gates at appropriate times for the ejection of material from said drums after compression.

40. In a device of the character described, a rotary support, a series of drums carried thereby, and rotatable on their axes, compression blocks located in said drums, means for feeding material to said drums, a heavy member connected with each of said compression blocks and free to be thrown outward by centrifugal force as said support is rotated, whereby said compression blocks are forced against the material operated upon, means for rotating said drums on their axes after the material is fed therein, a gate for each drum, means for opening said gates at appropriate times, and means for injecting a blast of air against the material in said drums, while a gate is open, for the ejection of the material from the drum.

41. In a device of the character described, a rotary support, a series of drums carried thereby, and rotatable on their axes, compression blocks located in said drums, means for feeding material to said drums, a series of weights pivotally supported by said rotary support and connected with said compression blocks and free to be thrown outward by centrifugal force as said support is rotated, whereby said compression blocks are forced against the material operated upon, means for rotating said drums on their axes after the material is fed therein, and means for ejecting the compressed material.

42. In a device of the character described, a rotary support, a series of drums carried thereby, and rotatable on their axes, compression blocks located in said drums, means for feeding material to said drums, a series of weights pivotally supported by said rotary support and connected with said compression blocks and free to be thrown outward by centrifugal force as said support is rotated, whereby said compression blocks are forced against the material operated upon, means for rotating said drums on their axes after the material is fed therein, and means for injecting a blast of air through said drums, after the material is compressed, to eject the compressed material.

43. In a device of the character described, a rotary support, a series of drums carried thereby, and rotatable on their axes, compression blocks located in said drums, means for feeding material to said drums, a series of weights pivotally supported by said rotary support and connected with said compression blocks and free to be thrown outward by centrifugal force as said support is rotated, whereby said compression blocks are forced against the material operated upon, means for rotating said drums on their axes after the material is fed therein, a gate for each drum, and means for opening said gates at appropriate times for the ejection of material from said drums after compression.

44. In a device of the character described, a rotary support, a series of drums carried thereby, and rotatable on their axes, compression blocks located in said drums, means for feeding material to said drums, a series of weights pivotally supported by said rotary support and connected with said compression blocks and free to be thrown outward by centrifugal force as said support is rotated, whereby said compression blocks are forced against the material operated upon, means for rotating said drums on their axes after the material is fed therein, a gate for each drum, means for opening said gates at appropriate times, and means for injecting a blast of air against the material in said drums, while a gate is open, for the ejection of the material from the drum.

45. In a device of the character described, a rotary support, a series of drums revolving with said support, means for compressing material in said drums, means for rotating the drums on their axes as said drums revolve with said support, and a cam for controlling the means for rotating the drums on their axes, said cam rotating at a slightly different speed than said rotary support whereby as one overtakes the other the cam will cause the drums to rotate.

46. In a device of the character described, a rotary support, a series of drums revolving with said support, means for compressing material in said drums, means for rotating the drums on their axes as said drums revolve with said support, clutches connected with said gearing, and a cam for controlling said clutches, said cam rotating at a slightly different speed than said rotary support whereby as one overtakes the other the cam will operate the clutches to rotate the drums.

47. In a device of the character described, a rotary support, a series of drums revolving with said support, valves for feeding material to said drums, means for compressing material in said drums, gearing for rotating the drums on their axes as said drums revolve with said support, clutches connected with said gearing, and a cam for controlling said clutches, said cam rotating at a slightly different speed than said rotary support whereby as one overtakes the other the cam will open the said feed valves and operate the clutches to rotate the drums.

48. In a device of the character described, a rotary support, a series of drums revolving with said support, valves for feeding material to said drums, valves for admitting air to said drums to eject the material after compression, means for compressing material in said drums, gearing for rotating the drums on their axes as said drums revolve with said support, clutches connected with said gearing, and a cam for controlling said clutches, said cam rotating at a slightly different speed than said rotary support whereby as one overtakes the other the cam will open the said feed and air valves and operate the clutches to rotate the drums.

49. In a device of the character described, a rotary support, a series of drums revolving with said support, valves for feeding material to said drums, valves for admitting air to said drums to eject the material after compression, a gate for each of said drums, valves for admitting air to said drums, means for compressing material in said drums, gearing for rotating the drums on their axes as said drums revolve with said support, clutches connected with said gearing, and a cam for controlling said clutches, said cam rotating at a slightly different speed than said rotary support whereby as one overtakes the other the cam will open the said feed and air valves, the aforesaid gates and operate the clutches to rotate the drums.

50. In a device of the character described, a rotary support, a series of compression blocks carried thereby centrifugally operating means for moving said compression blocks against the material operated upon, means for rotating said support and the parts carried thereby, and a cam for controlling the admission of material to said drums, said cam rotating at a slightly different speed than said rotary support whereby as one overtakes the other the material is fed.

51. In a device of the character described, a rotary support, a series of compression blocks carried thereby, centrifugally operating means for moving said compression blocks against the material operated upon, means for rotating said support and the parts carried thereby, means for feeding material to said drums, means for ejecting the compressed material, and a cam for controlling the means for admitting material to said drums and ejecting the compressed material, said cam rotating at a slightly slower speed than said rotary support whereby as the rotary support overtakes the cam the material is fed and the compressed material ejected.

52. In a device of the character described, a rotary support, a series of compression blocks carried thereby, centrifugally operating means for moving said compression blocks against the material operated upon, means for rotating said support and the parts carried thereby, a feed valve, an air valve for injecting air to eject the compressed material, and a cam for controlling said valves, said cam rotating at a slightly different speed than said rotary support whereby as one overtakes the other the valves are operated to feed the material and to eject it after it is compressed.

53. In a device of the character described, a rotary support, a series of drums carried thereby, compression blocks located in said drums, means for feeding material to said drums as said support is rotating, a series of weighted members carried by said support and connected with said compression blocks whereby as the rotary support is rapidly rotated the weighted members are thrown outward by centrifugal force to express liquid from the material between said drums and said compression blocks, and a cam for controlling the means for feeding material to said drums.

54. In a device of the character described, a rotary support, a series of drums carried thereby, compression blocks located in said drums, means for feeding material to said drums as said support is rotating, a series of weighted members carried by said support and connected with said compression blocks whereby as the rotary support is rapidly rotated the weighted members are thrown outward by centrifugal force to express liquid from the material between said drums and said compression blocks, and a cam for controlling the means for feeding material to said drums, said cam operating at a different speed than said rotary support whereby as one overtakes the other, the cam will operate the means for feeding material to said drums.

55. In a device of the character described, a rotary support, a series of drums carried thereby, compression blocks located in said drums, valves for feeding material to said drums as said support is rotating, a series of weighted members carried by said support and connected with said compression blocks whereby as the rotary support is rapidly rotated the weighted members are thrown outward by centrifugal force to express liquid from the material between said drums and said compression blocks, and a cam for controlling the valves for feeding material to said drums.

56. In a device of the character described, a rotary support, a series of drums carried thereby, compression blocks located in said drums, valves for feeding material to said drums as said support is rotating, a series of weighted members carried by said support and connected with said compression blocks whereby as the rotary support is rapidly rotated the weighted members are thrown outward by centrifugal force to express liquid from the material between said drums and said compression blocks, and a cam for controlling the valves for feeding material to said drums, said cam operating at a different speed from said rotary support whereby as one overtakes the other the cam opens the aforesaid valves to feed material to the drums.

57. In a device of the character described, a rotary support, a series of drums carried thereby, compression blocks located in said drums, valves for feeding material to said drums as said support is rotating, a series of weighted members carried by said support and connected with said compression blocks whereby as the rotary support is rapidly rotated the weighted members are thrown outward by centrifugal force to express liquid from the material between said drums and said compression blocks, a valve for injecting a blast of air through said drums to eject the material after it is compressed, and a cam for controlling the aforesaid feed and air valves.

58. In a device of the character described, a rotary support, a series of drums carried thereby, compression blocks located in said drums, valves for feeding material to said drums as said support is rotating, a series of weighted members carried by said support and connected with said compression blocks whereby as the rotary support is rapidly rotated the weighted members are thrown outward by centrifugal force to express liquid from the material between said drums and said compression blocks, a valve for injecting a blast of air through said drums to eject the material after it is compressed, and a cam for controlling the aforesaid feed and air valves, said cam operating at a different speed from said rotary support, whereby as one overtakes the other the cam will open the valves for feeding material and for ejecting the same.

59. In a device of the character described, a rotary support, a series of drums carried thereby, compression blocks located in said drums, valves for feeding material to said drums as said support is rotating, a series of weighted members carried by said support and connected with said compression blocks whereby as the rotary support is rapidly rotated the weighted members are thrown outward by centrifugal force to express liquid from the material between said drums and said compression blocks, a valve for injecting a blast through said drums, a gate for each compression block, and a cam for opening said feed and air valves and also for opening the gate, said cam operating at a different speed from said rotary support whereby as one overtakes the other the cam opens the gate, and also opens the air and feed valves.

60. In a device of the character described a rotary support, a series of drums carried thereby, compression blocks located in said drums, a valve for each drum for feeding material thereto as said support is rotating, a series of weighted members carried by said support and connected with said compression blocks whereby as the rotary support is rapidly rotated the weighted members are thrown out by centrifugal force to express liquid from between said drums and said compression blocks, a gate for each drum, a valve for injecting a blast of air through said drum while the gates are open for the ejection of material from the drums, and means for rotating said drum against the influence of the weighted members.

61. In a device of the character described, a rotary support, a series of drums carried thereby, compression blocks located in said drums, a valve for each drum for feeding material thereto as said support is rotating, a series of weighted members carried by said support and connected with said compression blocks whereby as the rotary support is rapidly rotated the weighted members are thrown out by centrifugal force to express liquid from between said drums and said compression blocks, a gate for each drum, a valve for injecting a blast of air through said drums while the gates are open for the ejection of material from the drums, means for rotating said drums against the influence of the weighted members, and cams for opening and closing the feed and air valves and for opening and closing the gates.

62. In a device of the character described, a rotary support, a series of drums carried thereby, compression blocks located in said drums, a valve for each drum for feeding material thereto as said support is rotating, a series of weighted members carried by said support and connected with said compression blocks whereby as the rotary support is rapidly rotated the weighted members are thrown out by centrifugal force to express liquid from between said drums and said compression blocks, a gate for each drum, a valve for injecting a blast of air through said drums while the gates are open for the ejection of material from the drums, means for rotating said drums against the influence of the weighted members, and cams for opening and closing the feed and air valves and for opening and closing the gates, said cams and said support operating at slightly different speeds whereby as one overtakes the other the cams open and close the feed and air valves and operate the same.

63. In a device of the character described, a shaft, a rotary support, a series of drums revolving with said support, gearing connecting said shaft with said drums, clutch mechanism, and means for periodically operating said clutches, whereby when said clutches are thrown into gear, the drums are rotated on their axes.

64. In a device of the character described, a shaft, a rotary support, a series of drums revolving with said support, centrifugally operated means for compressing material in said drums, gearing connecting said shaft with said drums, clutch mechanism, and means for periodically operating said clutches, whereby when said clutches are thrown into gear, the drums are rotated on their axes.

65. In a device of the character described, a shaft, a rotary support, a series of drums revolving with said support, gearing connecting said shaft with said drums, clutch mechanism, and a cam for periodically operating said clutches, whereby when said clutches are thrown into gear, the drums are rotated on their axes.

66. In a device of the character described, a shaft, a rotary support, a series of drums revolving with said support, centrifugally operated means for compressing material in said drums, gearing connecting said shaft with said drums, clutch mechanism, and a cam for periodically operating said clutches, whereby when said clutches are thrown into gear, the drums are rotated on their axes.

67. In a device of the character described, a shaft, a rotary support, a series of drums revolving with said support, weighted members pivotally carried by said rotary support and arranged to be thrown outward by centrifugal force as said support is rotated to compress material in said drums, gearing connecting said shaft with said drums, clutch mechanism, and means for periodically operating said clutches, whereby when said clutches are thrown into gear, the drums are rotated on their axes.

68. In a device of the character described, a rotary support, a series of drums revolving with said support, weighted members pivotally carried by said rotary support and arranged to be thrown outward by centrifugal force as said support is rotated to compress material in said drums, gearing connecting said shaft with said drums, clutch mechanism, and a cam for periodically operating said clutches, whereby when said clutches are thrown into gear, the drums are rotated on their axes.

69. In a device of the character described, a shaft, a rotary support, a series of drums revolving with said support, centrifugally operated means for compressing material in said drums, gearing connecting said shaft with said drums, clutch mechanism, means for periodically operating said clutches, whereby when said clutches are thrown into gear, the drums are rotated on their axes, and means for ejecting the compressed material from said drums.

70. In a device of the character described, a rotary support, a series of drums revolving with said support, weighted members pivotally carried by said rotary support and arranged to be thrown outward by centrifugal force as said support is rotated to compress material in said drums, gearing connecting said shaft with said drums, clutch mechanism, a cam for periodically operating said clutches, whereby when said clutches are thrown into gear, the drums are rotated on their axes, and means for ejecting the compressed material from said drums.

71. In a device of the character described, a shaft, a rotary support, a series of drums revolving with said support, centrifugally operated means for compressing material in said drums, gearing connecting said shaft with said drums, clutch mechanism, means for periodically operating said clutches, whereby when said clutches are thrown into gear, the drums are rotated on their axes, means for feeding material to said drums while the support is rotated, and means for ejecting the compressed material from said drums.

72. In a device of the character described, a rotary support, a series of drums revolving with said support, weighted members pivotally carried by said rotary support and arranged to be thrown outward by centrifugal force as said support is rotated to compress material in said drums, gearing connecting said shaft with said drums, clutch mechanism, a cam for periodically operating said clutches, whereby when said clutches are thrown into gear, the drums are rotated on their axes, means for feeding material to said drums while the support is rotated, and means for ejecting the compressed material from said drums.

73. In a device of the character described, a shaft, a rotary support, a series of drums revolving with said support, gearing connecting said shaft with said drums, clutch mechanism comprising a clutch for each drum and a plunger for each clutch, and a cam for periodically operating said plungers, whereby when said clutches are thrown into gear, the drums are rotated on their axes.

74. In a device of the character described, a shaft, a rotary support, a series of drums revolving with said support, centrifugally operated means for compressing material in said drums, gearing connecting said shaft with said drums, clutch mechanism comprising a clutch for each drum and a plunger for each clutch, and a cam for periodically operating said plungers, whereby when said clutches are thrown into gear, the drums are rotated on their axes.

75. In a device of the character described, a shaft, a rotary support, a series of drums revolving with said support, gearing connecting said shaft with said drums, clutch mechanism comprising a clutch for each drum and a plunger for each clutch, a cam for periodically operating said plungers, whereby when said clutches are thrown into gear, the drums are rotated on their axes, and means for feeding material to said drums while the support is rotated.

76. In a device of the character described, a shaft, a rotary support, a series of drums revolving with said support, centrifugally operated means for compressing material in said drums, gearing connecting said shaft with said drums, clutch mechanism comprising a clutch for each drum and a plunger for each clutch, a cam for periodically operating said plungers, whereby when said clutches are thrown into gear, the drums are rotated on their axes, and means for feeding material to said drums while the support is rotated.

77. In a device of the character described, a shaft, a rotary support, a series of drums revolving with said support, gearing connecting said shaft with said drums, clutch mechanism comprising a clutch for each drum and a plunger for each clutch, a cam for periodically operating said plungers, whereby when said clutches are thrown into gear, the drums are rotated on their axes, and means for ejecting the compressed material from said drums.

78. In a device of the character described, a shaft, a rotary support, a series of drums revolving with said support, centrifugally operated means for compressing material in said drums, gearing connecting said shaft with said drums, clutch mechanism comprising a clutch for each drum and a plunger for each clutch, a cam for periodically operating said plungers, whereby when said clutches are thrown into gear, the drums are rotated on their axes, and means for ejecting the compressed material from said drums.

79. In a device of the character described, a shaft, a rotary support, a series of drums revolving with said support, gearing connecting said shaft with said drums, clutch mechanism comprising a clutch for each drum and a plunger for each clutch, a cam for periodically operating said plungers, whereby when said clutches are thrown into gear, the drums are rotated on their axes, and means for feeding material to said drums while the support is rotated.

80. In a device of the character described, a shaft, a rotary support, a series of drums revolving with said support, centrifugally operated means for compressing material in said drums, clutch mechanism comprising a clutch for each drum and a plunger for each clutch, a cam for periodically operating said plungers, whereby when said clutches are thrown into gear, the drums are rotated on their axes, and means for feeding material to said drums while the support is rotated.

81. In a device of the character described, a rotary support, a series of drums revolving with said support, means for compressing material fed to said drums, a trough located under said drums, and tubes arranged to deliver the liquid expressed from said drums into said trough.

82. In a device of the character described, a rotary support, a series of drums revolving with said support, centrifugally operated means for compressing material fed to said drums, a trough located under said drums, and tubes arranged to deliver the liquid expressed from said drums into said trough.

83. In a device of the character described, a rotary support, a series of drums revolving with said support, means for compressing material fed to said drums, a trough located under said drums, tubes arranged to deliver the liquid expressed from said drums into said trough, and means for ejecting the compressed material from said drums.

84. In a device of the character described, a rotary support, a series of drums revolving with said support, centrifugally operated means for compressing material fed to said drums, a trough located under said drums, tubes arranged to deliver the liquid expressed from said drums into said trough, and means for ejecting the compressed material from said drums.

85. In a device of the character described, a rotary support, a series of drums revolving with said support, perforated plates and compression blocks carried by said drums, centrifugally operating means for forcing said compression blocks outwardly against said perforated plates, means for rotating the drums against the action of centrifugal force to receive a new charge, and means for delivering a fresh charge to said drums while the support carrying the drums is rotating.

86. In a device of the character described, a rotary support, a series of drums revolving with said support, perforated plates and compression blocks carried by said drums, centrifugally operating means for forcing said compression blocks outwardly against said perforated plates, means for rotating the drums against the action of centrifugal force to receive a new charge, means for delivering a fresh charge to said drums while the support carrying the drums is rotating, and means for ejecting the material from said drums after compression.

87. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, and means for delivering a fresh charge to said drums while the support carrying the drums is rotating.

88. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, means for delivering a fresh charge to said drums while the support carrying the drums is rotating, and means for ejecting the material from said drums after compression.

89. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, and valves for delivering a fresh charge to said drums while the support carrying the drums is rotating.

90. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, valves for delivering a fresh charge to said drums while the support carrying the drums is rotating, and means for ejecting the material from said drums after compression.

91. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, valves for delivering a fresh charge to said drums while the support carrying the drums is rotating, and a cam for opening and closing said feed valves.

92. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, valves for delivering a fresh charge to said drums while the support carrying the drums is rotating, means for ejecting the material from said drums after compression, and a cam for opening and closing said feed valves.

93. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, valves for delivering a fresh charge to said drums while the support carrying the drums is rotating, and valves for injecting air in said drums to eject the material after compression.

94. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, valves for delivering a fresh charge to said drums while the support carrying the drums is rotating, and valves for injecting air in said drums to eject the material after compression.

95. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, valves for delivering a fresh charge to said drums while the support carrying the drums is rotating, valves for injecting air in said drums to eject the material after compression, and a cam for opening and closing said feed and air valves.

96. In a device of the character described, a rotary support, a series of drums revolving with said support, perforated plates and compression blocks carried by said drums, weighted members carried by said support and connected with said blocks whereby as the support, drums and weighted members revolve, the latter are thrown outward by centrifugal force to force said compression blocks outwardly against said perforated plates, means for rotating the drums against the action of centrifugal force to receive a new charge, valves for delivering a fresh charge to said drums while the support carrying the drums is rotating, valves for injecting air in said drums to eject the material after compression, and a cam for opening and closing said feed and air valves.

97. In a device of the character described, a main shaft, a rotary support rotating around said shaft and carrying a series of drums, compression blocks in said drums, centrifugally operated means for forcing said compression blocks outward with respect to said rotary support as said support is rotated around said shaft, and a cam rotating at a different speed from said rotary support, and arranged as one of said parts gains on the other to control the action of said compression blocks and said drums.

98. In a device of the character described, a main shaft, a rotary support rotating around said shaft and carrying a series of drums, compression blocks in said drums, centrifugally operated means for forcing said compression blocks outward with respect to said rotary support as said support is rotated around said shaft, gearing for rotating said drums on their axes, clutches in said gearing, and a cam rotating at a different speed from said rotary support and arranged as one of said parts gains on the other to move said clutches and control the action of said compression blocks and said drums.

99. In a device of the character described, a rotary support, a compression block carried thereby, a valve for feeding material to said block, a valve for injecting a blast of air to eject the material after compression, a valve rod operating both of said valves, and a cam for moving said valve rod to open and close each of said valves at appropriate times to eject the compressed material and supply a new charge.

100. In a device of the character described, a rotary support, a compression block carried thereby, a valve for feeding material to said block, a valve for injecting a blast of air to eject the material after compression, a valve rod operating both of said valves, and a cam for moving said valve rod to open and close each of said valves at appropriate times to eject the compressed material and supply a new charge, said cam operating at a different speed from said rotary support whereby as one gains on the other the cam moves said valve rod.

101. In a device of the character described, a rotary support, a compression block carried thereby, centrifugally operating means for moving said compression block, a valve for feeding material to said block, a valve for injecting a blast of air to said block to eject the material after compression, a valve rod operating both of said valves, and a cam for moving said valve rod to open and close each of said valves at appropriate times to eject the compressed material and supply a new charge.

102. In a device of the character described, a rotary support, a compression block carried thereby, centrifugally operating means for moving said compression block, a valve for feeding material to said block, a valve for injecting a blast of air to said block to eject the material after compression, a valve rod operating both of said valves, and a cam for moving said valve rod to open and close each of said valves at appropriate times to eject the compressed material and supply a new charge, said cam operating at a different speed from said rotary support whereby as one gains on the other the cam moves said valve rod.

103. In a device of the character described, a rotary support a series of drums carried thereby, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, gates for said drums, and a cam having a cam groove for opening and closing the feed and air valves at appropriate times, a part for operating said clutches to rotate the drums and a groove for opening and closing said gates.

104. In a device of the character described, a rotary support, a series of drums carried thereby, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, gates for said drums, and a cam having a cam groove for opening and closing the feed and air valves at appropriate times, a part for operating said clutches to rotate the drums and a groove for opening and closing said gates, said cam operating at a different speed from that of the support whereby as one of said parts overtakes the other, the cam performs its functions as above stated.

105. In a device of the character described, a rotary support, a series of drums carried thereby, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, plungers for operating said clutches, gates for said drums, and a cam having a cam groove for opening and closing the feed and air valves at appropriate times, a part for operating said clutch plungers to rotate the drums and a groove for opening and closing said gates.

106. In a device of the character described, a rotary support, a series of drums carried thereby, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, plungers for operating said clutches, gates for said drums, and a cam having a cam groove for opening and closing the feed and air valves at appropriate times, a part for operating said clutch plungers to rotate the drums and a groove for opening and closing said gates, said cam operating at a different speed from that of the support whereby as one of said parts overtakes the other, the cam performs its functions as above stated.

107. In a device of the character described, a rotary support, a series of drums carried thereby, valves for feeding material to said drums as said support rotates, valves for injecting air in said drums as the support rotates for ejecting the material from said drums after compression, valve rods for actuating said valves, a main shaft, gearing between said shaft and each of said drums, clutches in said gearing arranged when the clutches are in operative position to rotate said drums on their axes, plungers for operating said clutches, gates for said drums, and a cam having a cam groove for operating said valve rods to open and close the feed and air valves at appropriate times, a part for operating said clutch plungers to rotate the drums and a groove for opening and closing said gates.

108. In a device of the character described, a rotary support, a series of drums carried thereby, valves for feeding material to said drums as said support rotates, valves for injecting air in said drums as the support rotates for ejecting the material from said drums after compression, valve rods for actuating said valves, a main shaft, gearing between said shaft and each of said drums, clutches in said gearing arranged when the clutches are in operative position to rotate said drums on their axes, plungers for operating said clutches, gates for said drums, and a cam having a cam groove for operating said valve rods to open and close the feed and air valves at appropriate times, a part for operating said clutch plungers to rotate the drums and a groove for opening and closing said gates, said cam operating at a different speed from that of the support whereby as one of said parts overtakes the other, the cam performs its functions as above stated.

109. In a device of the character described, a rotary support, a series of drums carried thereby, centrifugally operated means for compressing material in said drums, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, gates for said drums, and a cam having a cam groove for opening and closing the feed and air valves at appropriate times, a part for operating said clutches to rotate the drums and a groove for opening and closing said gates.

110. In a device of the character described, a rotary support, a series of drums carried thereby, centrifugally operated means for compressing material in said drums, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, gates for said drums, and a cam having a cam groove for opening and closing the feed and air valves at appropriate times, a part for operating said clutches to rotate the drums and a groove for opening and closing said gates, said cam operating at a different speed from that of the support whereby as one of said parts overtakes the other the cam performs its functions as above seated.

111. In a device of the character described, a rotary support, a series of drums carried thereby, centrifugally operated means for compressing material in said drums, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, plungers for operating said clutches, gates for said drums, and a cam having a cam groove for opening and closing the feed and air valves at appropriate times, a part for operating said clutch plungers to rotate the drums and a groove for opening and closing said gates.

112. In a device of the character described, a rotary support, a series of drums carried thereby, centrifugally operated means for compressing material in said drums, valves for feeding material to said drums as said support rotates, valves for injecting air in said drums as the support rotates for ejecting the material from said drums after compression, a main shaft, gearing between said shaft and each of said drums, clutches in said gearing arranged when the clutches are in operative position to rotate said drums on their axes, plungers for operating said clutches, gates for said drums, and a cam having a cam groove for opening and closing the feed and air valves at appropriate times, a part for operating said clutch plungers to rotate the drums and a groove for opening and closing said gates, said cam operating at a different speed from that of the support whereby as one of said parts overtakes the other, the cam performs its functions as above stated.

113. In a device of the character described, a rotary support, a series of drums carried thereby, centrifugally operated means for compressing material in said drums, valves for feeding material to said drums as said support rotates, valves for injecting air in said drums as the support rotates for ejecting the material from said drums after compression, valve rods for actuating said valves, a main shaft, gearing between said shaft and each of said drums, clutches in said gearing arranged when the clutches are in operative position to rotate said drums on their axes, plungers for operating said clutches, gates for said drums, and a cam having a cam groove for operating said valve rods to open and close the feed and air valves at appropriate times, a part for operating said clutch plungers to rotate the drums and a groove for opening and closing said gates.

114. In a device of the character described, a rotary support, a series of drums carried thereby, centrifugally operated means for compressing material in said drums, valves for feeding material to said drums as said support rotates, valves for injecting air in said drums as the support rotates for ejecting the material from said drums after compression, valve rods for actuating said valves, a main shaft, gearing between said shaft and each of said drums, clutches in said gearing arranged when the clutches are in operative position to rotate said drums on their axes, plungers for operating said clutches, gates for said drums, and a cam having a cam groove for operating said valve rods to open and close the feed and air valves at appropriate times, a part for operating said clutch plungers to rotate the drums and a groove for opening and closing said gates, said cam operating at a different speed from that of the support whereby as one of said parts overtakes the other, the cam performs its functions as above stated.

115. In a device of the character described, a main shaft, a rotary support, a series of drums carried by said support and revolving therewith, gears on said drums, gearing between the gears on said drums and said shaft, clutches in said gearing arranged when the clutches are in gear to rotate said drums on their axes as said parts rotate around said shaft, and a cam rotatable around said main shaft arranged to operate said clutches.

116. In a device of the character described, a main shaft, a rotary support, a series of drums carried by said support and revolving therewith, gears on said drums, gearing between the gears on said drums and said shaft, clutches in said gearing arranged when the clutches are in gear to rotate said drums on their axes as said parts rotate around said shaft, and a cam rotatable around said main shaft arranged to operate said clutches, said cam and said support rotating at different speeds whereby as one overtakes the other said cam operates said clutches to rotate the drums on their axes.

117. In a device of the character described, a main shaft, a rotary support, a series of drums carried by said support and revolving therewith, gears on said drums, gearing between the gears on said drums and said shaft, clutches in said gearing arranged when the clutches are in gear to rotate said drums on their axes as said parts rotate around said shaft, plungers for moving said clutches, and a cam rotatable around said main shaft and arranged to move said plungers and operate the clutches.

118. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said parts rotate around said shaft, and a cam rotatable around said main shaft arranged to operate said clutches.

119. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said parts rotate around said shaft, and a cam rotatable around said main shaft arranged to operate said clutches, said cam and said support rotating at different speeds whereby as one overtakes the other said cam operates said clutches to rotate the drums on their axes.

120. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said support rotates around said shaft, plungers for moving said clutches, and a cam rotatable around said main shaft and arranged to move said plungers and operate the clutches.

121. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said support rotates around said shaft, valves for feeding material to said drums, valves for injecting air into said drums to eject the compressed material therefrom, and a cam rotatable around said main shaft and arranged to operate said clutches and to open and close the feed and air valves.

122. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said support rotates around said shaft, valves for feeding material to said drums, valves for injecting air into said drums to eject the compressed material therefrom, and a cam rotatable around said main shaft and arranged to operate said clutches and to open and close the feed and air valves.

123. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said support rotates around said shaft, plungers for moving said clutches, valves for feeding material to said drums, valves for injecting air into said drums to eject the compressed material therefrom, and a cam rotatable around said main shaft and arranged to move said plungers to operate said clutches and to open and close the feed and air valves.

124. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said support rotates around said shaft, plungers for operating said clutches, valves for feeding material to said drums, valves for injecting air to said drums to eject the compressed material therefrom, and a cam rotatable around said main shaft at a different speed from said support whereby said cam operates said clutches and opens and closes the feed and air valves.

125. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said support rotates around said shaft, plungers for operating said clutches, valves for feeding material to said drums, valves for injecting air to said drums to eject the compressed material therefrom, gates for said drums, and a cam rotatable around said main shaft and arranged to operate said clutches and to open and close the feed and air valves and said gates.

126. In a device of the character described, a main shaft, a rotary support, a series of drums carried by said support and revolving therewith, a series of weighted members pivotally connected to said support and arranged to be thrown outward by centrifugal force to compress the material in said drums, gears on said drums, gearing between the gears on said drums and said shaft, clutches in said gearing arranged when the clutches are in gear to rotate said drums on their axes as said support rotates around said shaft, plungers for operating said clutches, valves for feeding material to said drums, valves for injecting air to said drums to eject the compressed material therefrom, gates for said drums, and a cam rotatable around said main shaft at a different speed from said support whereby said cam operates said clutches and opens and closes the feed and air valves and said gates.

127. In a device of the character described, a main shaft, a rotary support comprising top and bottom plates rotatable around said shaft, a series of drums carried by said plates and revolving therewith, compression blocks and perforated plates in said drums, gears on said drums, gearing between the gears on said drums and said shaft, clutches in said gearing arranged when the clutches are in gear to rotate said drums on their axes as said plates rotate around said shaft, and a cam rotatable around said main shaft arranged to operate said clutches.

128. In a device of the character described, a main shaft, a rotary support comprising top and bottom plates rotatable around said shaft, a series of drums carried by said plates and revolving therewith, compression blocks and perforated plates in said drums, gears on said drums, gearing between the gears on said drums and said shaft, clutches in said gearing arranged when the clutches are in gear to rotate said drums on their axes as said plates rotate around said shaft, and a cam rotatable around said main shaft arranged to operate said clutches, said cam and said support rotating at different speeds whereby as one overtakes the other said cam operates said clutches to rotate the drums on their axes.

129. In a device of the character described, a main shaft, a rotary support comprising top and bottom plates rotatable around said shaft, a series of drums carried by said plates and revolving therewith, compression blocks and perforated plates in said drums, gears on said drums, gearing between the gears on said drums and said shaft, clutches in said gearing arranged when the clutches are in gear to rotate said drums on their axes as said plates rotate around said shaft, plungers for moving said clutches, and a cam rotatable around said main shaft and arranged to move said plungers and operate the clutches.

130. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, and a cam rotatable around said main shaft arranged to operate said clutches.

131. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, and a cam rotatable around said main shaft arranged to operate said clutches, said cam and said support rotating at different speeds whereby as one overtakes the other said cam operates said clutches to rotate the drums on their axes.

132. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, plungers for moving said clutches, and a cam rotatable around said main shaft and arranged to move said plungers and operate the clutches.

133. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, and a cam rotatable around said main shaft arranged to operate said clutches.

134. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, valves for feeding material to said drums, valves for injecting air into said drums to eject the compressed material therefrom, and a cam rotatable around said main shaft and arranged to operate said clutches and to open and close the feed and air valves.

135. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, valves for feeding material to said drums, valves for injecting air into said drums to eject the compressed material therefrom, and a cam rotatable around said main shaft at a different speed from said support and plates whereby said cam operates said clutches to open and close the feed and air valves.

136. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, plungers for operating said clutches, valves for feeding material to said drums, valves for injecting air to said drums to eject the compressed material therefrom, and a cam rotatable around said main shaft and arranged to move said plungers to operate said clutches and to open and close the feed and air valves.

137. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, plungers for operating said clutches, valves for feeding material to said drums, valves for injecting air to said drums to eject the compressed material therefrom, gates for said drums, and a cam rotatable around said main shaft and arranged to operate said clutches and to open and close the feed and air valves and said gates.

138. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, plungers for operating said clutches, valves for feeding material to said drums, valves for injecting air to said drums to eject the compressed material therefrom, gates for said drums, and a cam rotatable around said main shaft at a different speed from said support and plates whereby said cam operates said clutches and opens and closes the feed and air valves and said gates.

139. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, plungers for operating said clutches, valves for feeding material to said drums, valves for injecting air to said drums to eject the compressed material, valve rods for said valves, and a cam rotatable around said main shaft and arranged to operate said plungers to throw the clutches to rotate the drums and to operate said valve rods to open and close the feed and air valves.

140. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said plates rotate around said shaft, plungers for operating said clutches, valves for feeding material to said drums, valves for injecting air to said drums to eject the compressed material, valve rods for said valves, gates for said drums, and a cam rotatable around said main shaft and arranged to operate said plungers to throw the clutches to rotate the drums and to operate said valve rods to open and close the feed and air valves and said gates.

141. In a device of the character described, a main shaft, a rotary support comprising top and bottom plates rotatable around said shaft, a series of drums carried by said plates and revolving therewith, a series of weighted members pivotally connected to said support and arranged to be thrown outward by centrifugal force to compress the material in said drums, compression blocks and perforated plates in said drums, gears on said drums, gearing between the gears on said drums and said shaft, clutches in said gearing arranged when the clutches are in gear to rotate said drums on their axes as said parts rotate around said shaft, plungers for operating said clutches, valves for feeding material to said drums, valves for injecting air to said drums to eject the compressed material, valve rods for said valves, gates for said drums, and a cam rotatable around said main shaft at a different speed than said support and plates rotate whereby said cam moves said plungers to throw the clutches to rotate the drums and to operate said valve rods to open and close the feed and air valves and to open and close said gates.

142. In a device of the character described, a main shaft, a rotary support comprising top and bottom plates rotatable around said shaft, a series of drums carried by said plates and revolving therewith, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air to said drums to eject the compressed material, and a cam revolving around said shaft in proximity to said plates, said cam having one portion arranged to periodically operate said clutches to rotate the drums on their axes and a groove to operate said feed and air valves.

143. In a device of the character described, a main shaft, a rotary support comprising top and bottom plates rotatable around said shaft, a series of drums carried by said plates and revolving therewith, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air into said drums to eject the compressed material, valve rods for said valves, gates for said drums, plungers for said clutches, and a cam having one portion arranged to operate said clutch plungers to operate the drums on their axes, a groove to operate the valve rod to open and close the feed and air valves, and another groove to open and close the gates.

144. In a device of the character described, a main shaft, a rotary support comprising top and bottom plates rotatable around said shaft, a series of drums carried by said plates and revolving therewith, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air to said drums to eject the compressed material, and a cam revolving around said shaft in proximity to said plates, said cam having one portion arranged to periodically operate said clutches to rotate the drums on their axes and a groove to operate said feed and air valves, and said cam rotating at a slower speed from said plates and their coöperating parts whereby as said plates gain on the cam the cam performs its functions as above stated.

145. In a device of the character described, a main shaft, a rotary support comprising top and bottom plates rotatable around said shaft, a series of drums carried by said plates and revolving therewith, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air into said drums to eject the compressed material, valve rods for said valves, gates for said drums, plungers for said clutches, and a cam having one portion arranged to operate said clutch plungers to operate the drums on their axes, a groove to operate the valve rod to open and close the feed and air valves, and another groove to open and close the gates, said cam rotating at a slower speed from said plates and their coöperating parts whereby as said plates gain on the cam the cam performs its functions as above stated.

146. In a device of the character described, a main shaft, a rotary support comprising top and bottom plates rotatable around said shaft, a series of drums carried by said plates and revolving therewith, weighted members pivotally supported by rotatable plates and arranged to be thrown outward by centrifugal force as said plates rotate around said shaft and thereby compress material in said drums, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air to said drums to eject the compressed material, and a cam revolving around said shaft in proximity to said plates, said cam having one portion arranged to periodically operate said clutches to rotate the drums on their axes and a groove to operate said feed and air valves.

147. In a device of the character described, a main shaft, a rotary support comprising top and bottom plates rotatable around said shaft, a series of drums carried by said plates and revolving therewith, weighted members pivotally supported by rotatable plates and arranged to be thrown outward by centrifugal force as said plates rotate around said shaft and thereby compress material in said drums, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air into said drums to eject the compressed material, valve rods for said valves, gates for said drums, plungers for said clutches, and a cam having one portion arranged to operate said clutch plungers to operate the drums on their axes, a groove to operate the valve rod to open and close the feed and air valves, and another groove to open and close the gates.

148. In a device of the character described, a main shaft, a rotary support comprising top and bottom plates rotatable around said shaft, a series of drums carried by said plates and revolving therewith, weighted members pivotally supported by rotatable plates and arranged to be thrown outward by centrifugal force as said plates rotate around said shaft and thereby compress material in said drums, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air to said drums to eject the compressed material, and a cam revolving around said shaft in proximity to said plates, said cam having one portion arranged to periodically operate said clutches to rotate the drums on their axes and a groove to operate said feed and air valves, and said cam rotating at a slower speed from said plates and their coöperating parts whereby as said plates gain on the cam the cam performs its functions as above stated.

149. In a device of the character described, a main shaft, a rotary support comprising top and bottom plates rotatable around said shaft, a series of drums carried by said plates and revolving therewith, weighted members pivotally supported by rotatable plates and arranged to be thrown outward by centrifugal force as said plates rotate around said shaft and thereby compress material in said drums, gears on said drums, gearing carried by said plates between the gears on said drums and said shaft, clutches revolving with said plates arranged when in gear to rotate said drums on their axes as said plates rotate around said shaft, valves for feeding material to said drums, valves for injecting a blast of air into said drums to eject the compressed material, valve rods for said valves, gates for said drums, plungers for said clutches, and a cam having one portion arranged to operate said clutch plungers to operate the drums on their axes, a groove to operate the valve rod to open and close the feed and air valves, and another groove to open and close the gates, said cam rotating at a slower speed from said plates and their coöperating parts whereby as said plates gain on the cam the cam performs its functions as above stated.

150. In a device of the character described, a rotary support, means for compressing material therein, a valve for feeding material to be compressed, a valve for injecting a blast of air to eject the material after compression, one of said valves having gear teeth thereon, a valve rod having rack teeth engaging the teeth on said valve, and a cam for moving said valve rod to open and close said feed and air valves at appropriate times to eject the compressed material and supply a new charge.

151. In a device of the character described, a rotary support, means for compressing material therein, a valve for feeding material to be compressed, a valve for injecting a blast of air to eject the material after compression, one of said valves having gear teeth thereon, a valve rod having rack teeth engaging the teeth on said valve, and a cam for moving said valve rod to open and close said feed and air valves at appropriate times to eject the compressed material and supply a new charge, said cam having one portion arranged to operate said valve rod to open and close one of said valves, and another portion to move said valve rod to open and close the other valve.

152. In a device of the character described, a rotary support, means for compressing material therein, a valve for feeding material to be compressed, a valve for injecting a blast of air to eject the material after compression, one of said valves being operated from the other, and one of said valves having gear teeth thereon, a valve rod having rack teeth engaging the teeth on said valve, and a cam for moving said valve rod to open and close said feed and air valves at appropriate times to eject the compressed material and supply a new charge.

153. In a device of the character described, a rotary support, means for compressing material therein, a valve for feeding material to be compressed, a valve for injecting a blast of air to eject the material after compression, one of said valves being operated from the other, and one of said valves having gear teeth thereon, a valve rod having rack teeth engaging the teeth on said valve, and a cam for moving said valve rod to open and close said feed and air valves at appropriate times to eject the compressed material and supply a new charge, said cam having one portion arranged to operate said valve rod to open and close one of said valves, and another portion to move said valve rod to open and close the other valve.

In testimony whereof I affix my signature in presence of two witnesses.

ABRAHAM S. KIRSHNER.

Witnesses:
D. H. SOLIS-COHEN,
E. WARING WILSON.

Copies of this patent may be obtained for five cents each, by addressing the "Commissioner of Patents, Washington, D. C."